(12) United States Patent
Chang et al.

(10) Patent No.: US 9,871,608 B1
(45) Date of Patent: Jan. 16, 2018

(54) METHODS AND APPARATUS FOR AGGREGATION OF MULTIPLE PULSE CODE MODULATION CHANNELS INTO A SIGNAL TIME DIVISION MULTIPLEXING STREAM

(71) Applicant: The Boeing Company, Chicago, IL (US)

(72) Inventors: Chen J. Chang, Madison, AL (US); Amir L. Liaghati, Jr., Huntsville, AL (US); Mahsa L. Liaghati, Huntsville, AK (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/281,028

(22) Filed: Sep. 29, 2016

(51) Int. Cl.
| | |
|---|---|
| *G08C 19/16* | (2006.01) |
| *H04J 3/06* | (2006.01) |
| *H04L 12/861* | (2013.01) |
| *H04L 29/06* | (2006.01) |
| *G01D 7/00* | (2006.01) |

(52) U.S. Cl.
CPC ............. *H04J 3/06* (2013.01); *G01D 7/00* (2013.01); *H04L 49/90* (2013.01); *H04L 69/22* (2013.01)

(58) Field of Classification Search
CPC ... H04J 3/06; G01D 7/00; H04L 69/22; H04L 49/90
USPC ............ 340/870.19; 370/338, 432, 458, 412, 370/389, 395.42, 316, 401, 465, 329, 326, 370/352, 403; 375/147, 214, 261, 282, 375/322, 340; 348/14.8; 240.3
See application file for complete search history.

(56) References Cited

U.S. PATENT DOCUMENTS

| | | | | |
|---|---|---|---|---|
| 6,826,179 B1* | 11/2004 | Talbot | ................... | G06F 13/423 370/389 |
| 2002/0018518 A1* | 2/2002 | Subramanian | ....... | H04B 1/7115 375/147 |

(Continued)

OTHER PUBLICATIONS

Consultative Committee for Space Data Systems (CCSDS) Secretariat, "TM Synchronization and Channel Coding", Recommended Standard CCSDS 131.0-B-2, Aug. 2011.

(Continued)

*Primary Examiner* — Dhaval Patel
(74) *Attorney, Agent, or Firm* — McDonnell Boehnen Hulbert & Berghoff LLP

(57) ABSTRACT

Methods and apparatus are provided for telemetry processing using a telemetry processor. The telemetry processor can include a plurality of communications interfaces, a computer processor, and data storage. The telemetry processor can buffer sensor data by: receiving a frame of sensor data using a first communications interface and clock data using a second communications interface, receiving an end of frame signal using a third communications interface, and storing the received frame of sensor data in the data storage. After buffering the sensor data, the telemetry processor can generate an encapsulated data packet including a single encapsulated data packet header, the buffered sensor data, and identifiers identifying telemetry devices that provided the sensor data. A format of the encapsulated data packet can comply with a Consultative Committee for Space Data Systems (CCSDS) standard. The telemetry processor can send the encapsulated data packet using a fourth and a fifth communications interfaces.

20 Claims, 15 Drawing Sheets

(56) References Cited

U.S. PATENT DOCUMENTS

| | | | |
|---|---|---|---|
| 2006/0061531 A1* | 3/2006 | Park | G09G 3/2003 345/88 |
| 2012/0065813 A1* | 3/2012 | Nguyen | H04L 67/125 701/2 |
| 2013/0142287 A1* | 6/2013 | Kravets | H04W 52/0245 375/340 |

OTHER PUBLICATIONS

Consultative Committee for Space Data Systems (CCSDS) Secretariat, "Encapsulation Service", Recommended Standard CCSDS 133.1-B-2, Oct. 2009.

Consultative Committee for Space Data Systems (CCSDS) Secretariat, "AOS Space Data Link Protocol", Recommended Standard CCSDS 732.0-B-2, Jul. 2006.

C. Jia, "A Delay-Locked Loop for Multiple Clock Phases/Delays Generation", Ph.D. Dissertation, Dec. 2005, Georgia Institute of Technology.

M. Kearney, "Comm and Data Standards for Future Human Spaceflight", Jun. 2013.

National Instruments, "What is I/Q Data?", Mar. 30, 2016, available via the Internet at www.ni.com/tutorial/4805/en/ (last viisted Jul. 19, 2016).

B.C. O'Neill et al., "Serial Communication Circuit with Optimized Skew Characteristics", IEEE Communication Letters, Jun. 2001, vol. 5, No. 6, pp. 260-262.

Range Commanders Counsel, "Chapter 4—Pulse Code Modulation Standards", Inter-Range Instrumentation Group (IRIG) Standard 106-15, Part 1, Chapter 4, Jul. 2015, available via the Internet at www.irig106.org/docs/106-15/chapter4.pdf (last visited Aug. 17, 2016).

M. Rouse, "Staggered Quadrature Phase-Shift Keying", Jun. 2007, available via the Internet at searchnetworking.techtarget.com/definition/staggered-quadrature-phase-shift-keying (last visited Sep. 29, 2016).

Telecommunications Industry Association, "Electrical Characteristics of Balanced Voltage Digital Interface Circuits", TIA/EIA Standard TIA/EIA-433-B, May 1994.

Wikimedia Foundation, "RS-422", Jul. 1, 2015, available via the Internet at en.wikipedia.org/w/index.php?title=RS-422&oldid=669438128 (last viisted Jul. 19, 2016).

* cited by examiner

METHODS AND APPARATUS FOR AGGREGATION OF MULTIPLE PULSE CODE MODULATION CHANNELS INTO A SIGNAL TIME DIVISION MULTIPLEXING STREAM

GOVERNMENT LICENSE RIGHTS

This invention was made with Government support under contract number NNM07AB03C awarded by NASA. The Government has certain rights in this invention.

FIELD

The present disclosure generally relates to processing of pulse code modulation channels with telemetry data, and more particularly to methods and apparatus for aggregation of multiple pulse code modulation channels with telemetry data into a single time division multiplexing stream.

BACKGROUND

Unless otherwise indicated herein, the materials described in this section are not prior art to the claims in this application and are not admitted to be prior art by inclusion in this section.

Telemetry includes communications of measured data about devices operating in an environment that may be remote or hazardous, such as spacecraft, undersea submersibles, exploratory craft, and utility meters. The data can be transmitted from the devices to receiving equipment located at a more accessible place, such as a ground station monitoring and controlling a spacecraft or a surface vessel monitoring a submersible. The telemetry data can include information about the device, information about the environment, and/or other measurement data.

Several standards apply to telemetry. For example, the Consultative Committee for Space Data Systems (CCSDS), the International Telecommunications Union (ITU), the Inter-Range Instrumentation Group (TRIG), and the Water Industry Telemetry Standards (WITS) Protocol Standards Association promulgate several telemetry-oriented standards. Other standards, such as the RS-422 standard promulgated by the American National Standards Institute (ANSI) as "ANSI/TIA/EIA-422-B Electrical Characteristics of Balanced Voltage Differential Interface Circuits", also known as the Telecommunications Industry Association/Electrical Industry Association (TIA/EIA) 422 standard, and the equivalent X.27 Standard promulgated by the ITU, may be applicable to telemetry as well.

SUMMARY

In one aspect, a telemetry processor is described. The telemetry processor includes a plurality of communications interfaces; one or more computer processors; and data storage. The data storage stores instructions that, upon execution by the one or more computer processors, cause the telemetry processor to perform functions. The functions include: buffering sensor data by at least: receiving a frame of sensor data using a first communications interface and clock data using a second communications interface of the plurality of communications interfaces, receiving a signal indicating an end of the frame of sensor data using a third communications interface of the plurality of communications interfaces, and storing the received frame of sensor data in the data storage; after buffering the sensor data, generating an encapsulated data packet including a single encapsulated data packet header, the buffered sensor data, and a plurality of identifiers identifying a plurality of telemetry devices providing the sensor data, where a format of the encapsulated data packet complies with a Consultative Committee for Space Data Systems (CCSDS) standard; and sending the encapsulated data packet using a fourth communications interface and a fifth communications interface of the plurality of communications interfaces.

In another aspect, a method for sending encapsulated data packets is described. A telemetry processor buffers sensor data by at least: receiving a frame of sensor data using a first communications interface and a second communications interface of a plurality of communications interfaces of the telemetry processor, receiving a signal indicating an end of the frame of sensor data using a third communications interface of the plurality of communications interfaces, and storing the received frame of sensor data. After buffering the sensor data, the telemetry processor generates an encapsulated data packet. The encapsulated data packet includes a single encapsulated data packet header, the buffered sensor data, and a plurality of identifiers identifying a plurality of telemetry devices providing the sensor data, where a format of the encapsulated data packet complies with a CCSDS standard. The telemetry processor sends the encapsulated data packet using a fourth communications interface and a fifth communications interface of the plurality of communications interfaces.

In another aspect, a non-transitory computer readable medium is described having stored thereon instructions, that when executed by one or more computer processors of a telemetry processor, cause the telemetry processor to perform functions. The functions include: buffering sensor data by at least: receiving a frame of sensor data using a first communications interface and clock data using a second communications interface of a plurality of communications interfaces of the telemetry processor, receiving a signal indicating an end of the frame of sensor data using a third communications interface of the plurality of communications interfaces of the telemetry processor, and storing the received frame of sensor data; after buffering the sensor data, generating an encapsulated data packet including a single encapsulated data packet header, the buffered sensor data, and a plurality of identifiers identifying a plurality of telemetry devices providing the sensor data, where a format of the encapsulated data packet complies with a CCSDS standard; and sending the encapsulated data packet using a fourth communications interface and a fifth communications interface of the plurality of communications interfaces.

The features, functions, and advantages that have been discussed can be achieved independently in various embodiments or may be combined in yet other embodiments further details of which can be seen with reference to the following description and drawings.

BRIEF DESCRIPTION OF THE FIGURES

Various examples of particular embodiments are described herein with reference to the following figures, wherein like numerals denote like entities, in which.

DETAILED DESCRIPTION

Figure 1:
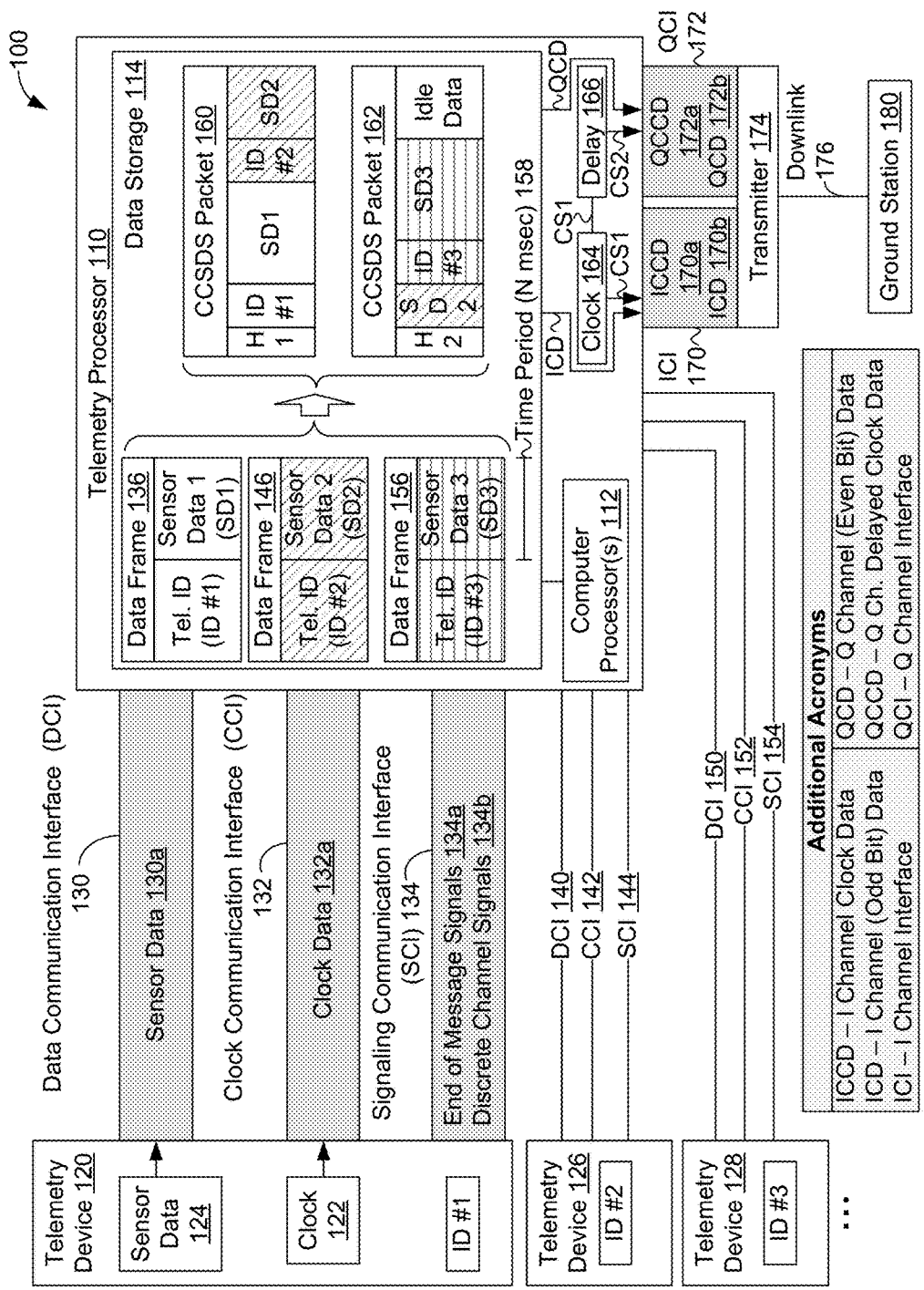
FIG. 1 is a block diagram of a telemetry system, in accordance with an example embodiment.

In some examples herein, techniques for improving reception and transmission of telemetry data are described, such as sensor data that can include data about one or more measurements generated by one or more sensors associated with one or more telemetry devices. The telemetry device(s) can send the telemetry data to a telemetry processor, which can format the telemetry data for further transmission. In an example where the telemetry processor is aboard a spacecraft, the telemetry processor can transmit the formatted telemetry data to a ground station via a downlink or other transmission channel. The telemetry data can be used at the ground station to monitor the vehicle, to observe the environment, to provide instructions to the vehicle, and/or for other purposes. Other example uses of telemetry devices and telemetry processors are possible as well.

The telemetry processor can receive signals from the telemetry devices that identify telemetry devices that send data, such as messages and/or frames of telemetry data, and indicate when a complete message or frame of telemetry data has been provided. These signals can enable the telemetry processor to speed data transmission by eliminating decoding the received telemetry data before transmission. Each message or frame of telemetry data can include Pulse Code Modulation (PCM) data formatted according to an IRIG-106 standard. The data can be transmitted from a telemetry device to the telemetry processor via one or more data communication interfaces (DCIs), while the signals can be transmitted to the telemetry processor via one or more signaling communication interfaces (SCIs). The signals sent over the signaling communication interfaces can include an end-of-frame signal and one or more discrete channel signals that can indicate an identifier and/or other information about the telemetry device. By using the end-of-frame and discrete channel signals, the telemetry processor can reduce or even eliminate decoding of received PCM data.

Data that arrives at the telemetry processor can be subject to a time requirement, such as a realtime telemetry constraint that data received at the telemetry processor has to be transmitted to ground station via a downlink within a predetermined maximum period of time, such as 100 milliseconds. The telemetry processor can buffer data received from multiple telemetry devices for a buffering period that is a portion of the maximum period of time; e.g., a value between 10 and 30 milliseconds.

In some scenarios, telemetry data is transmitted in fixed-sized amounts, such as a 7072 bit amount for a multiplexing protocol data unit (M_PDU) within an Advanced Orbiting Systems (AOS) Transfer Frame specified by CCSDS 732.0-B-2. By buffering the data during the buffering period of time, the likelihood that enough telemetry data will arrive during the buffering period to fill an M_PDU or other data unit increases, thereby decreasing the amount of filled (e.g., unused) data that will be transmitted in the data unit and reducing consequent overhead for data transmission. As the telemetry data being transmitted may be received from a number of telemetry devices; e.g., as a number of IRIG-106 formatted data frames, generating an AOS transfer frame with buffered data can involving ensuring that buffered data can include data about which telemetry device(s) provided data being sent in the AOS transfer frame.

The telemetry processor can use multiple pairs of standard-compliant data interfaces to increase bandwidth for transmission of telemetry data, such as two or more pairs of RS-422 interfaces, to a transmitter transmitting data to the ground station. Each RS-422 interface can transmit using a cable, and the maximum data rate is 10 Mbps (megabits per second) per RS-422 interface for a cable whose length does not exceed 40 feet, according to the TIA/EIA-422 standard. Therefore, using a pair of RS-422-compliant data interfaces can effectively double bandwidth for telemetry data transmission.

Each data interface in a pair of data interfaces can transmit different data. For example, one data interface of the pair can transmit even bits of a data source (e.g., bits numbered 0, 2, 4, 6 . . . ) and the other data interface can transmit odd bits of the data source (e.g., bits numbered 1, 3, 5, 7 . . . ). The even bits and odd bits can both separately transmitted while being synchronized using a common clock. The odd bits can be transmitted based on a clock signal having a predetermined clock period of time generated by the common clock, and the odd bits can be based on a delayed clock signal generated by delaying the clock signal by a delay period of time, such ½ or another fraction of the predetermined clock period. For example, if the predetermined clock period is 100 nanoseconds, then the delay period of time can be 50 nanoseconds, and the pair of data interfaces can transmit an odd bit and an even bit (for 2 bits every 100 nanoseconds, for a data rate of 20 megabits per second. In this example, odd bit (I channel) data 170b and even bit (Q channel) data 172b can be considered to be interleaved between two respective interfaces 170, 172 and transmitted according to a 50 nanosecond per bit clock from telemetry processor 110 to transmitter 174; e.g., having an effective maximum data output rate of 20 megabits/second for the interleaved odd bit and even bit data.

FIG. 1 is a block diagram of telemetry system 100, in accordance with an example embodiment. Telemetry system 100 can include telemetry devices 120, 126, 128, telemetry processor 110, transmitter 174, and ground station 180. Telemetry devices 120, 126, 128, telemetry processor 110, and transmitter 174 can be operating in an environment, such as aboard a vehicle operating in space, on land, in the air, or sea.

Telemetry processor 110 can be connected to telemetry device 120 via communication interfaces, such data communication interface 130, clock communication interface 132, and signaling communication interface 134. Similarly, telemetry processor 110 can be connected to telemetry device 126 via communication interfaces, such data communication interface 140, clock communication interface 142, and signaling communication interface 144 and telemetry processor 110 can be connected to telemetry device 128 via communication interfaces, such data communication interface 150, clock communication interface 152, and signaling communication interface 154. Telemetry processor 110 can be connected to transmitter 174 via I channel interface (ICI) 170 and Q channel interface (QCI) 172. Further, transmitter 174 can be connected to ground station 180 via downlink 176. In some embodiments, some or all of data communication interface 130, clock communication interface 132, signaling communication interface 134, I channel interface 170, Q channel interface 172, and downlink 174 can be replicated for reliability and perhaps other reasons; e.g., two or more physical data communication interfaces can act as one logical data communication interface 130, two or more physical signaling communication interfaces can act as one logical signaling communication interface 132, etc.

FIG. 1 shows that telemetry device 120 can include one or more sensors that generate sensor data 124, which can be transmitted as sensor data 130a to telemetry processor 110 via data communication interface 130 and clock 122 that can generate clock data that can be transmitted as clock data 132 to telemetry processor 110 via clock communication interface 132. Telemetry device 120 can generate signals, such as end of message signals 134a and discrete message signals 134b that can be transmitted to telemetry processor 110 via clock communication interface 134.

Telemetry processor 110 can include one or more computer processors 112, data storage 114, clock 164, and delay 166. Data storage 114 can store instructions that, upon execution by computer processor(s) 112, cause telemetry processor 110 to perform functions. Those functions include buffering sensor data, such as sensor data 132a. Telemetry processor 110 can receive frame(s) of sensor data via data communication interfaces 130, 140, and/or 150 and can receive clock data via clock communication interfaces 132, 142, and/or 152.

Telemetry processor 110 can receive one or more end of message signals 134a indicating an end of a message, frame, packet, or other formatted unit of data; e.g., sensor data, via signaling communication interface 134. Telemetry processor 110 can also receive one or more discrete signals 134b via signaling communication interface 134. The one or more discrete signals 134b include: one or more discrete signals that identify a source telemetry device for a frame of sensor data; e.g., a signal identifying "ID #1", which refers to telemetry device 120, as a source for data frame 136; one or more discrete signals that relate to a configuration of a telemetry device; and/or other discrete signals.

Received frames of sensor data can be stored as data frames in data storage 114; for example, FIG. 1 shows data storage 114 storing data frame 136 received from telemetry device 120 as indicated by telemetry identifier (Tel. ID.) of "ID #1", which is the identification number (ID) of telemetry device 120. Data frame 136 also includes sensor data 1 (SD1) which can include some or all of sensor data 130a. Also, FIG. 1 shows data storage 114 storing respective data frames 146 and 156 received from respective telemetry devices 126 and 128 as indicated by respective telemetry identifiers of "ID #2" and "ID #3", which are the respective identification numbers (ID) of respective telemetry devices 126 and 128. Data frames 146 and 156 also respectively include sensor data 2 and sensor data 3, which can include some or all of sensor data transmitted to telemetry processor 110 via from respective telemetry devices 126 and 128.

In some embodiments, a data frame can include sensor data that has been buffered for a predetermined period of time, such as time period 158. Time period 158 can be determined as a number N of milliseconds; e.g., N can be a number in the range between 0 and 100, such as N=20.

In other embodiments, sensor data can be associated with a number of types of telemetry data; e.g., video types, audio types, binary types, types associated with particular sensors and/or observations, other types such as flight operation data. Suppose a frame of sensor data F1 is associated with a first type of telemetry (or sensor) data T1. Upon reception of frame F1, telemetry processor 110 can buffer frame F1. Then, telemetry processor 110 can receive another frame of sensor data F2 that is associated with a second type of telemetry data T2, where types T1 and T2 differ. Then, after receiving sensor data of type T2, telemetry processor 110 can generate and send a first-type encapsulated data packet including a single encapsulated data packet header and the buffered type T1 sensor data (e.g., from frame F1). Telemetry processor 110 can also generating a second-type encapsulated data packet including a single encapsulated data packet header and the buffered type T2 sensor data (e.g., from frame F2), where formats of both the first-type and second-type encapsulated data packets comply with at least one CCSDS standard.

Then, after buffering the sensor data, telemetry processor 110 can generate one or more data frames or packets, such as CCSDS packets 160 and 162. Each of CCSDS packets 160 and 162 includes a respective data frame or data packet header shown as "H1" for CCSDS packet 160 and "H2" for CCSDS packet 162 indicated by a format of a data packet or data frame compliant with a CCSDS standard. For example, one or more encapsulation packets can be generated that are compliant with CCSDS Standard 133.1-B-2 and the encapsulated data packet(s) can be included in an AOS transfer frame that is compliant with CCSDS Standard 732.0-B-2 and/or in a channel access data unit (CADU) compliant with CCSDS Standard 131.0-B-2. In this case, the "H1" and/or "H2" headers can be transfer frame headers of AOS transfer frames compliant with CCSDS Standard 732.0-B-2. As another example, one or more of CCSDS packets 160 and 162 can be encapsulation packets; then the "H1" and/or "H2" headers can be encapsulation packet headers compliant with CCSDS Standard 133.1-B-2 Other examples of CCSDS packets 160 and 162 and headers H1 and H2 are possible.

FIG. 1 shows that CCSDS packet 160 can include ID numbers ID #1 and ID #2, sensor data 1, a portion of sensor data 2; that is, CCSDS packet 160 includes the contents of data frame 136 and part of the contents of data frame 146. CCSDS packet 162 can include a portion of sensor data 2 not in CCSDS packet 160, ID number ID #3, and sensor data 3; that is, CCSDS packet 162 includes the portion of the contents of data frame 146 not in CCSDS packet 160 and the contents of data frame 156.

Telemetry processor can send CCSDS packets 160 and/or 162 to transmitter 174 using I channel interface 170 and Q channel interface 172. In particular, I channel interface 170 can communicate I channel clock data (ICCD) 170a and I channel data (ICD) 170b, while Q channel interface 172 can communicate Q channel clock data (QCCD) 172a and Q channel data (QCD) 172b. Together, I channel data 170b and Q channel data 172b can include the data of one or more data frames or packets such as CCSDS Packets 160 and 162. In some embodiments, I channel interface 170 and Q channel interface 172 can simultaneously communicate respective I channel data 170b and Q channel data 172b to transmitter 174.

In particular of these embodiments, each of CCSDS packets 160 and 162 can include even bit data and odd bit data. Then, I channel interface 170 and Q channel interface 172 can simultaneously communicate the data of one or more data frames and/or packets by sending the odd bit data; i.e., I channel data 170b, via I channel interface 170; and sending the even bit data; i.e., Q-channel data 172b, via Q channel interface 172.

Telemetry processor can include clock 164 and delay 166. Clock 164 can generate a clock signal (CS); e.g., clock signal 1 (CS1) as illustrated in FIG. 1. Clock signal 1 can be provided as input to delay 166. Delay 166 can be configured to generate a clock signal; e.g, clock signal 2 (CS2) as illustrated in FIG. 1. Clock signal 1 can be a periodic signal having a predetermined clock period; e.g., 100 nanoseconds; 250 nanoseconds, 1 microsecond. Clock signal 2 can be generated by delay 166 postponing clock signal 1 by a predetermined delay period of time. The delay period can be based on the clock period; e.g., one-quarter of the clock period, one-half of the clock period, two-thirds of the clock period. For example, if the clock period is 100 nanoseconds, and the delay period is one-half of the clock period, then the delay period is 50 nanoseconds.

Sending each of CCSDS packets 160 and 162 can include sending I channel clock data 170a using I channel interface 170 that can include data generated from clock signal 1, which is generated by clock 164, and can include sending Q channel clock data 172a using Q channel interface 172 that can include data generated from clock signal 2 by delay 164. For example, I channel clock data 170a can include data representing clock signal 1 and Q channel clock data 172a can include data representing clock signal 2. I channel clock data 170a and Q channel clock data 172a can be sent simultaneously using respective I channel interface 170 and Q channel interface 172 to transmitter 174.

Transmitter 174 can communicate I channel clock data 170a, I channel data 170b, Q channel clock data 172a, and/or Q channel data 172b to ground station 180 via downlink 176.

Operational Methods

Figure 2:
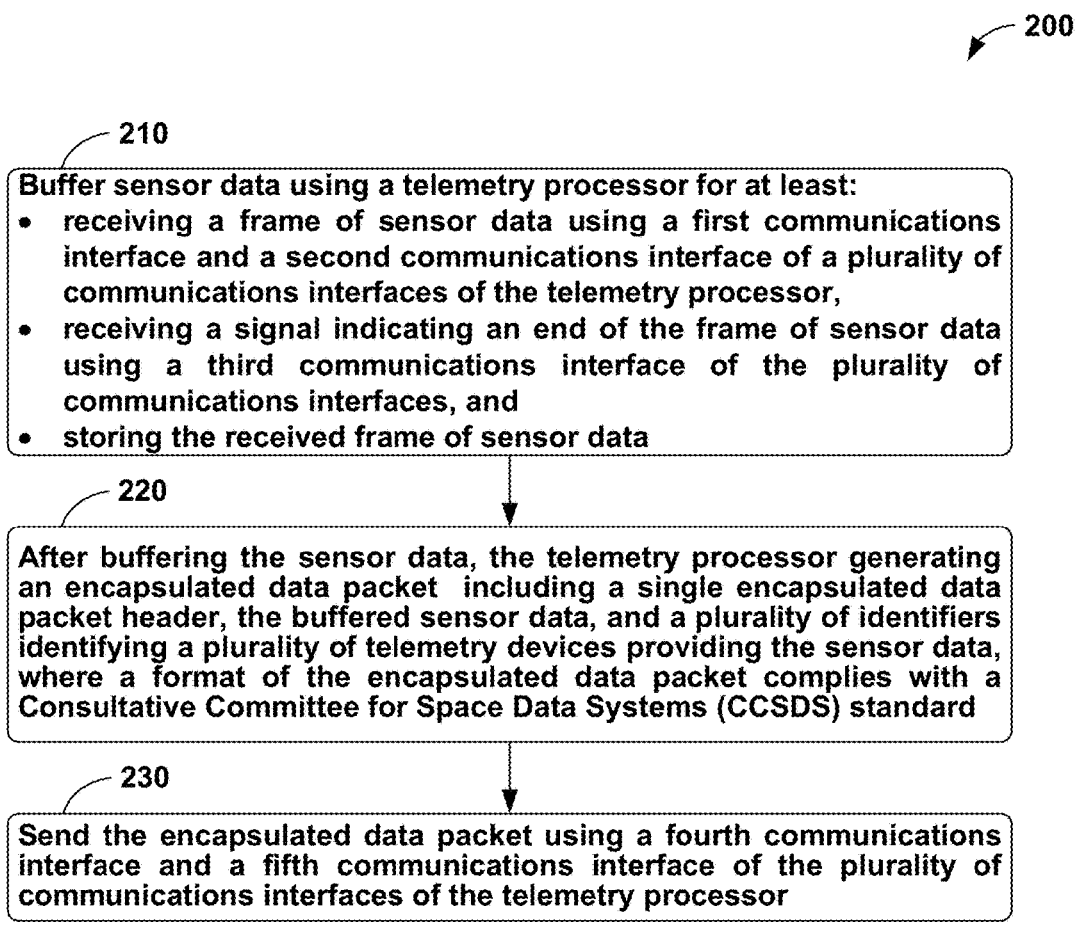
FIG. 2 is a flowchart of a method, in accordance with an example embodiment.

FIG. 2 is a flowchart of method 200, in accordance with an example embodiment. Method 200 can be performed by a telemetry processor, such as telemetry processor 110, to send data frames. Method 200 can begin at block 210, where the telemetry processor can buffer sensor data by at least: receiving a frame of sensor data using a first communications interface and a second communications interface of a plurality of communications interfaces of the telemetry processor; receiving a signal indicating an end of the frame of sensor data using a third communications interface of the plurality of communications interfaces; and storing the received frame of sensor data, such as discussed herein at least in the context of FIGS. 1 and 3-6.

In some embodiments, buffering the sensor data can include buffering the sensor data for a predetermined period of time, such as discussed herein at least in the context of FIGS. 1 and 3-6.

In other embodiments, buffering the sensor data can include receiving a discrete channel of data via the third communication interface, where the discrete channel of data can include data identifying a source telemetry device for the frame of sensor data, such as discussed herein at least in the context of FIGS. 1 and 3-6.

At block 220, the telemetry processor can, after buffering the sensor data, generate an encapsulated data packet that includes a single encapsulated data packet header, the buffered sensor data, and a plurality of identifiers identifying a plurality of telemetry devices providing the sensor data, where a format of the encapsulated data packet complies with a CCSDS standard, such as discussed herein at least in the context of FIGS. 1 and 7-10.

Figure 12:
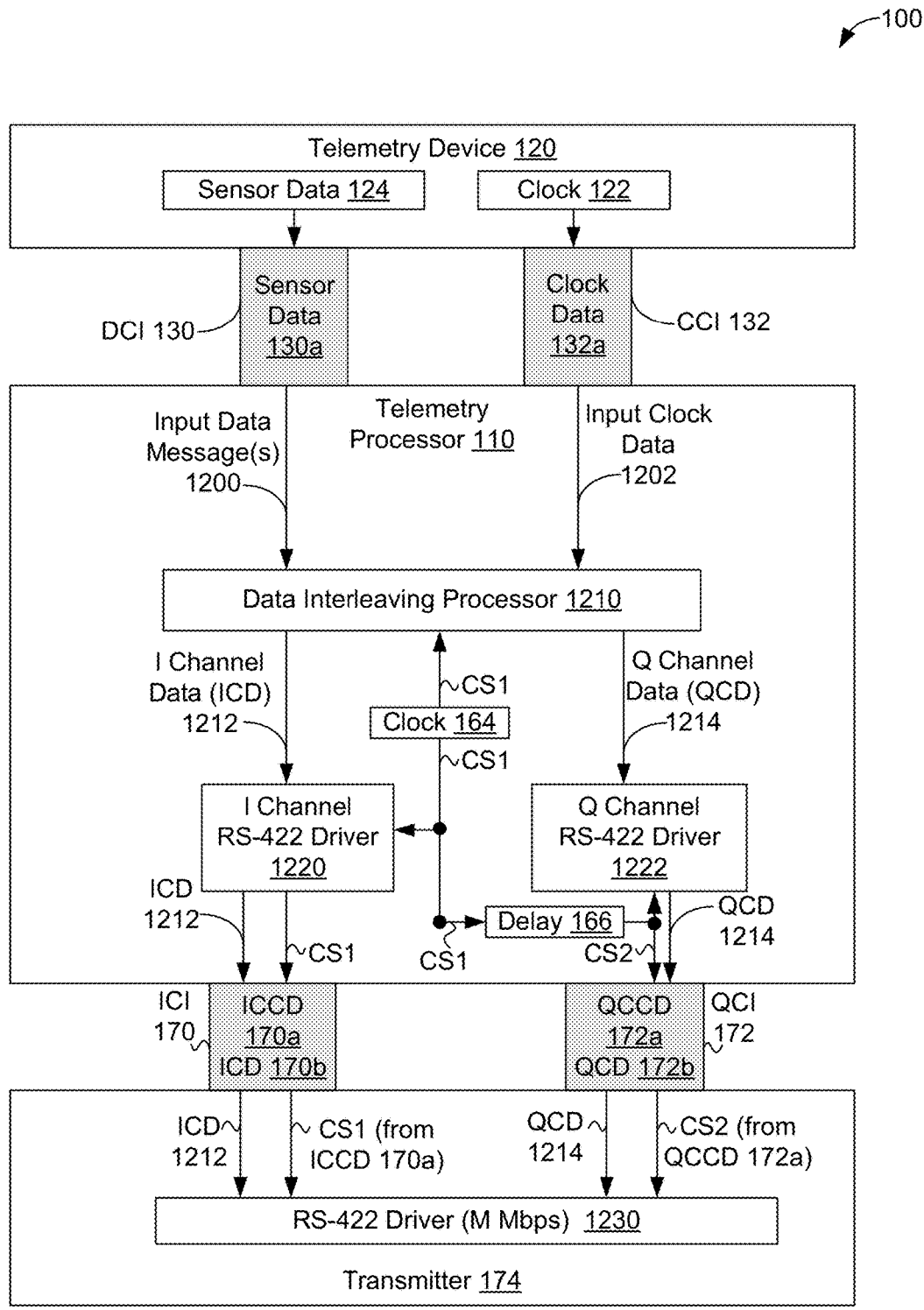
FIG. 12 is another block diagram of a telemetry system, in accordance with an example embodiment.
Figure 13:
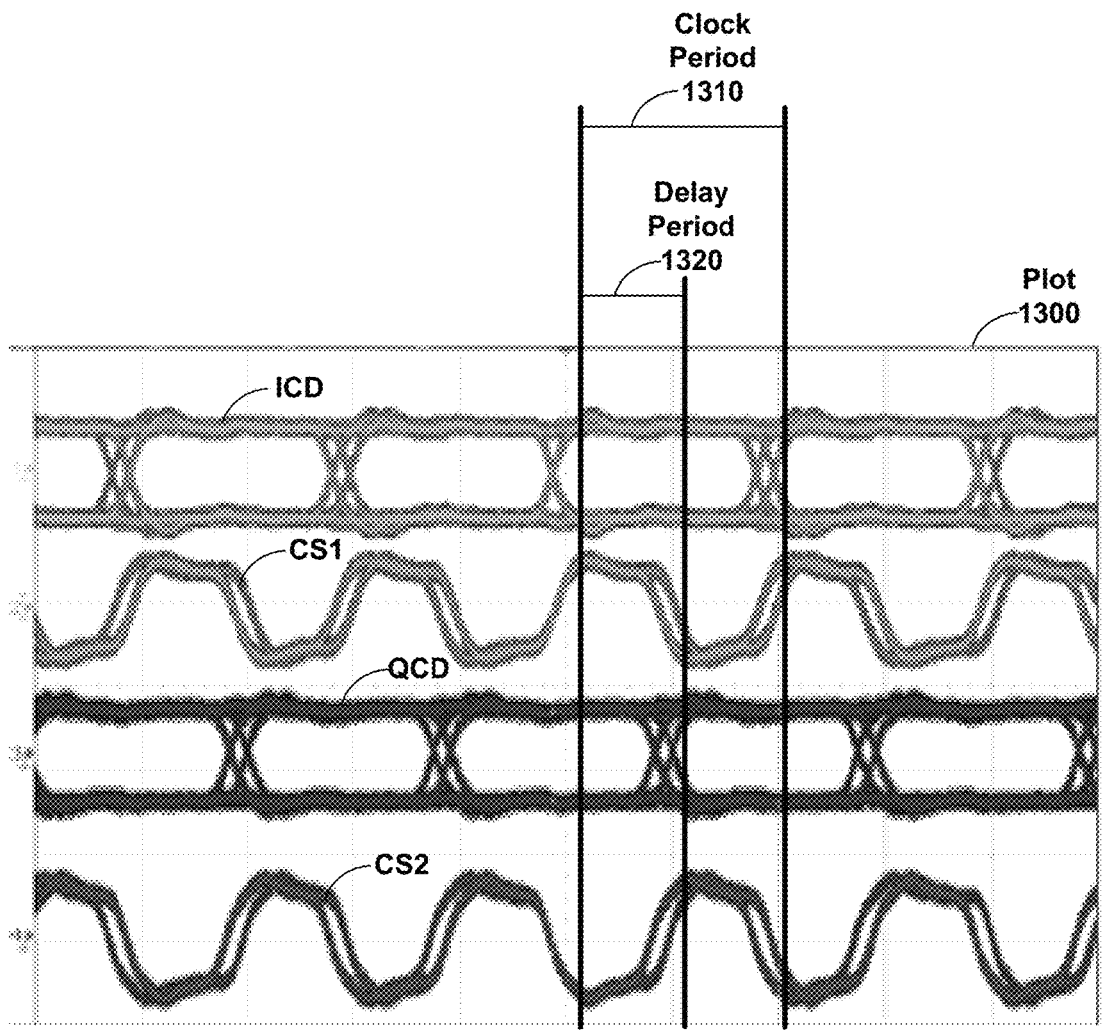
FIG. 13 is a plot of data and clock signals, accordance with an example embodiment.

At block 230, the telemetry processor can send the encapsulated data packet using a fourth communications interface and a fifth communications interface of the plurality of communications interfaces, such as discussed herein at least in the context of FIGS. 1, 12, and 13.

In some embodiments, sending the encapsulated data packet using the fourth communications interface and the fifth communications interface can include sending the encapsulated data packet using both the fourth and fifth communication interfaces simultaneously, such as discussed herein at least in the context of FIGS. 1, 12, and 13. In particular of these embodiments, the encapsulated data packet can include even bit data and odd bit data. Then, sending the encapsulated data packet using both the fourth and fifth communication interfaces simultaneously can include sending the odd bit data via the fourth communication interface and sending the even bit data via the fifth communication interface, such as discussed herein at least in the context of FIGS. 1, 12, and 13.

In other particular of these embodiments, the fourth communications interface and the fifth communications interface can share a common clock generating a first clock signal and the fifth communications interface can be associated with a delay device that generates a second clock signal which differs from the first clock signal. Then, sending the encapsulated data packet using both the fourth and fifth communication interfaces simultaneously can include sending first clock data based on the first clock signal via the fourth communication interface and sending second clock data based on the second clock signal via the fifth communication interface, such as discussed herein at least in the context of FIGS. 1, 12, and 13.

In particular of the other particular embodiments, the common clock can be configured to generate the first clock signal with a predetermined clock period of time and the delay device can be configured to determine the second clock signal by delaying the first clock signal for a delay period of time, where the delay period is based on one half of the predetermined clock period, such as discussed herein at least in the context of FIGS. 1, 12, and 13.

In some embodiments, the sensor data can be associated with a plurality of types of telemetry (or sensor) data, where the frame of sensor data is associated with a first type of telemetry data. Then, method 200 can further include: buffering first-type sensor data that is associated with a first type of the plurality of types of telemetry data; after the buffering the first-type sensor data, receiving second-type sensor data that is associated with a second type of the plurality of types of telemetry data that differs from the first type of telemetry data; and after receiving the second-type sensor data: generating a first-type encapsulated data packet including a single encapsulated data packet header and the buffered first-type sensor data, and generating a second-type encapsulated data packet including a single encapsulated data packet header and the second-type sensor data, where formats of both the first-type and second-type encapsulated data packets comply with the CCSDS standard, such as discussed herein at least in the context of FIGS. 1 and 6-10.

Improved Signaling for Telemetry Processing

Figure 3:
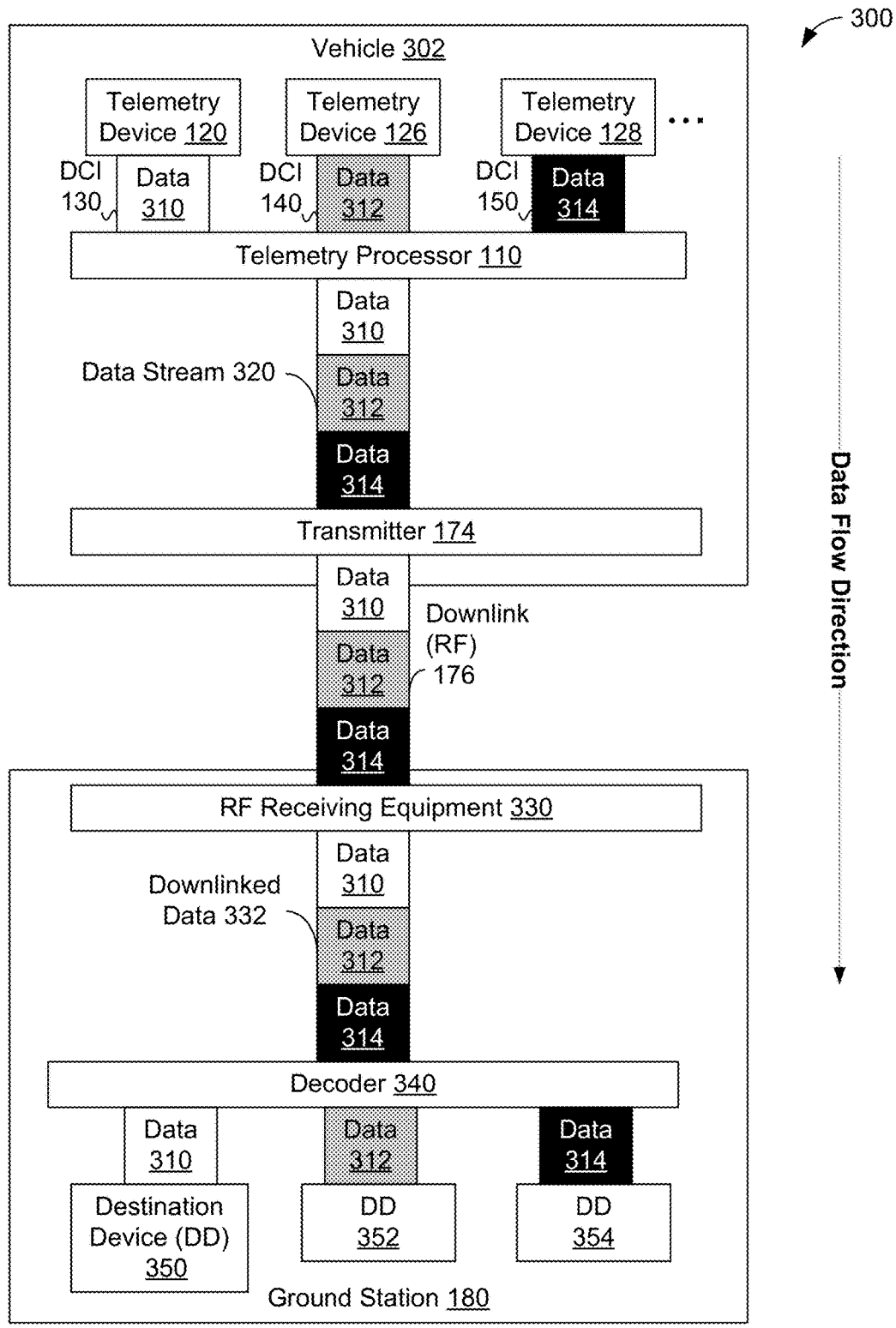
FIG. 3 is a block diagram of another telemetry system, in accordance with an example embodiment.

FIG. 3 is a block diagram of telemetry system 300, in accordance with an example embodiment. Telemetry system 300 includes vehicle 302 and ground station 180, where vehicle 302 includes telemetry devices 120, 126, and 128, telemetry processor 110, and transmitter 174, and where ground station 180 includes radio frequency (RF) receiving equipment 330, decoder 340, and destination devices (DDs) 350, 352, and 354.

The system level design implementation of telemetry system 300 includes telemetry processor 110 and telemetry devices 120, 126, and 128. Telemetry processor 110 can receive data 310 from telemetry device 120 via data communication interface 130, receive data 312 from telemetry device 126 via data communication interface 140, and/or receive data 314 from telemetry device 128 via data communication interface 150. Some or all of data 310, 312, and 314 can be encoded using pulse code modulation (PCM) included as IRIG-106 formatted data.

Upon receiving a frame from a telemetry device, such as data 310, 312, or 314, telemetry processor 110 can add header information to the received message, where the header information can identify a telemetry device that sent the received frame. In some embodiments, the header information can include, but is not limited to, an identifier of the telemetry device that sent the received frame, data about a configuration of the telemetry device that sent the received frame, a timestamp indicating a time for sending and/or receiving the frame, and frame sequence information. For example, upon receiving data 310 at telemetry processor 110, telemetry processor can add header information to data 310 that includes an identifier of telemetry device 120; e.g., a value of 1 as FIG. 1 shows that telemetry device 120 has an "ID" of "1", data about a configuration of telemetry device 120, a timestamp indicating when data 310 was received at telemetry processor 110, and frame sequence information for data 310. After appending the identifier at a beginning of a received frame, telemetry processor 110 can multiplex received frames, and reformat the messages into a single, continuous, CCSDS-compliant format downlink telemetry output to the ground station, such as data stream 320 and/or downlink 176.

Ground station 180 can receive downlinked telemetry data as downlink 176 and/or downlinked data 332 to reconstruct the received data into multiple frames of data based on the header information in the downlinked telemetry data. Upon receiving the telemetry data in data stream 320 at ground station 180 via RF receiving equipment 330, decoder 340 can separate out data 310, 312, and 314 from downlinked data 332; i.e., remove CCSDS headers from reformatted CCSDS data in from downlinked data 332. Decoder 340 can then reconstruct the received data of downlinked data 332 into multiple data streams, shown as in FIG. 3 as data 310 being provided to destination device 350, data 312 being provided to destination device 352, and data 312 being provided to destination device 352.

In some embodiments, the multiple data streams can include data formatted according to an IRIG-106 format. In other examples, data 310, 312, and 314 can be provided to one or two destination devices, while in other examples, data 310, 312, and 314 can be provided to more than three destination devices. In still other examples, data 310, 312, and 314 can be stored at ground station 180 and later retrieved by devices, such as one or more of destination devices 350, 352, and 354. In even other examples, more, fewer, and/or different telemetry devices than telemetry devices 120, 126, and 128 can provide data; while in still other examples, more, fewer, and/or different data can be provided as part of data stream 320. Many other examples are possible as well.

Figure 4:
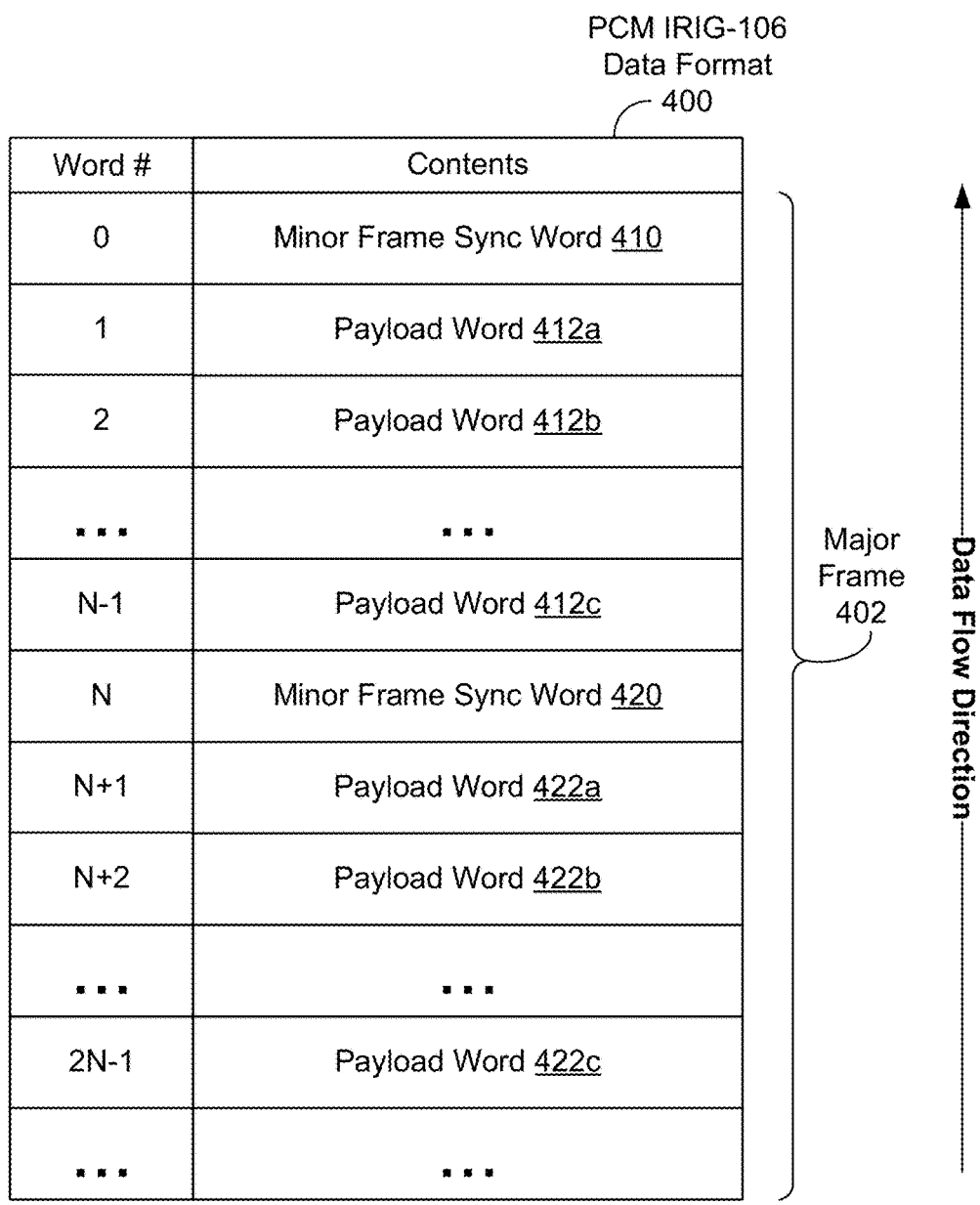
FIG. 4 is a diagram for a data format, in accordance with an example embodiment.

FIG. 4 is a diagram for data format 400, in accordance with an example embodiment. Some implementations of telemetry processor 110 rely on telemetry processor 110 to process data received from telemetry devices; e.g., telemetry devices 120, 126, and/or 128. For example, in PCM IRIG-106 data format 400, one or more synchronization words or "sync words", such as minor frame sync words 410 and 420, are included. Each sync word can represent a beginning of a frame; for example, PCM IRIG-106 data format 400 includes a first frame that starts with one sync word 410 and N–1 payload words 412a, 412b, ... 412c, for a total of N words in the first frame, and also includes a second frame with N words that start with one sync word 420 and N–1 payload words 422a, 422b, ... 422c.

Telemetry processor 110 and/or a ground system receiver, such as ground system RF receiving equipment 330, can rely on a "sync word" in order to determine when a beginning or end of a frame, where each frame is expected to include a same type of telemetry data. Telemetry processor 110 can rely on sync words to determine frame boundaries in packaging multiple PCM input data frames; e.g., data 310, 312, 314 into a single time division multiplexed (TDM) output; e.g., data in downlink 176. Also, ground system RF receiving equipment 330 can rely on sync words to determine frame boundaries to reconstruct multiple PCM data streams from received TDM data.

However, telemetry processor 110 (and/or the ground system receiver) can expend a relatively-large amount of resources merely to find sync words in received data. Also, for correct processing of data in data stream 320 and/or downlinked data 332, one or more particular sync words can have to be negotiated between telemetry processor 110 in vehicle 302 and ground system RF receiving equipment 330 at ground station 180. If a frame in is dropped or corrupted during transmission between vehicle 302 and ground station 180, then ground system RF receiving equipment 330 can have to reestablish downlink 176 after receiving a correct sync word from telemetry processor 110 causing a delay in transmission.

Figure 5:
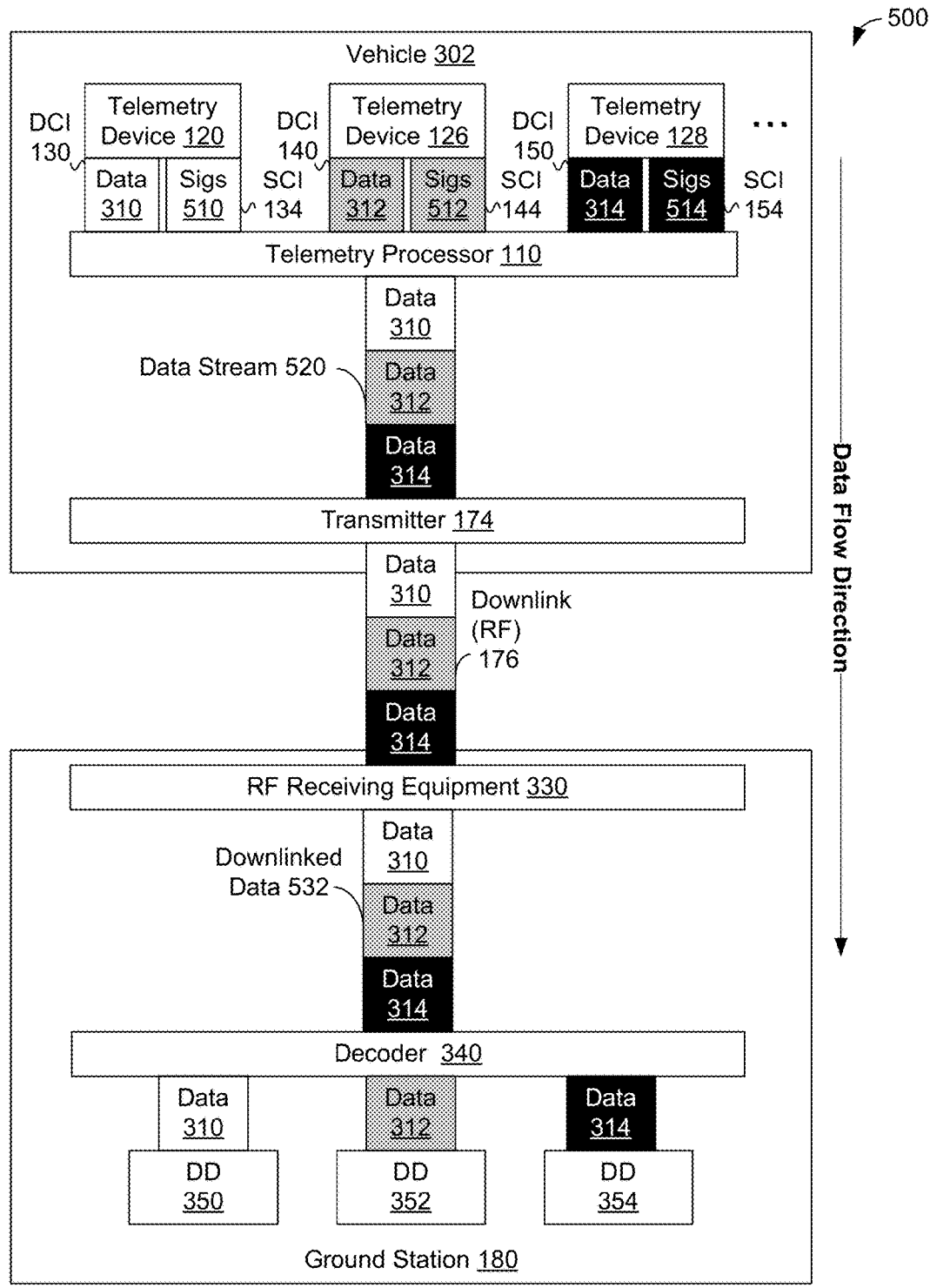
FIG. 5 is a block diagram of yet another telemetry system, in accordance with an example embodiment.

FIG. 5 is a block diagram of telemetry system 500, in accordance with an example embodiment. Telemetry system 500 includes vehicle 302 and ground station 180, where vehicle 302 includes telemetry devices 120, 126, and 128, telemetry processor 110, and transmitter 174, and where ground station 180 includes RF receiving equipment 330, decoder 340, and destination devices 350, 352, and 354.

One technique to reduce or even eliminate reliance on sync words, which can also reduce design complexity of telemetry processor 110, involves utilization of the three data interfaces, such as pairs of RS-422 interfaces, for data transmission and synchronization between telemetry processor 110 and a telemetry device. Two of the three data interfaces can be used to communicate sensor data and clock data, such as data communication interfaces 130, 140, 150 and clock communication interfaces 132, 142, 152 of FIG. 1 and data communication interfaces 130, 140, 150 of FIGS. 1, 3, and 5. The third data interface can convey signals, such as end of message signals and signals for one or more discrete channels that notify telemetry processor 110 about a current telemetry configuration of a telemetry device, such as signaling communication interfaces 134, 144, 154 of FIG. 1 and signaling communications interfaces 134, 144, 154 of FIGS. 1 and 5.

When signaling communication interfaces 134, 144, 154 are used, sync words may be unused, when a ground receiver, such as ground station 180, is not tasked to reassemble received telemetry data in an TRIG format. Each of signaling communication interfaces 134, 144, 154 can provide signals indicating the ends of messages, and so sync words may be replaced by end of message signals in communications between telemetry devices and telemetry processor 110. And for communications between telemetry processor 110 and transmitter 174/ground station 180, source identifiers/Data Exchange Message (DEM) identifiers discussed below in the context of at least FIGS. 7-9, can represent the end of a frame, packet, or message rather than sync words. Thus, use of end of message signals and source identifiers/DEM identifiers to identify the ends of frames, packets, and/or messages can make the use of sync words redundant, and so sync words could be eliminated in communicating telemetry data.

More specifically, telemetry devices 120, 126, 128 and respective data communication interfaces 130, 140, 150 can perform the same tasks in telemetry system 500 as discussed above in the context of telemetry system 300 to communicate respective data 310, 312, 314 to telemetry processor 110. In telemetry system 500, telemetry devices 120, 126, 128 can utilize respective signaling communication interfaces 134, 144, 154 to communicate respective end of message signals and signals for one or more discrete channels 510, 512, 514 to telemetry processor 110. Telemetry processor 110 can use respective signals 510, 512, 514 received over respective signaling communication interfaces 134, 144, 154 from respective telemetry devices 120, 126, 128 to form data stream 520 from respective data 310, 312, 314. Once formed, telemetry processor 110 can provide data stream 520 to transmitter 174.

Upon receiving the telemetry data in data stream 520 at ground station 180 via RF receiving equipment 330, decoder 340 can separate out data 310, 312, and 314 from downlinked data 532 as discussed above regarding from downlinked data 332. Decoder 340 can then reconstruct the received data of downlinked data 532 into multiple data streams, shown as in FIG. 5 as data 310 being provided to destination device 350, data 312 being provided to destination device 352, and data 312 being provided to destination device 352. In some embodiments, the multiple data streams can include data formatted according to an IRIG-106 format. In other examples, data 310, 312, and 314 can be provided to one or two destination devices, while in other examples, data 310, 312, and 314 can be provided to more than three destination devices. In still other examples, data 310, 312, and 314 can be stored at ground station 180 and later retrieved by devices, such as one or more of destination devices 350, 352, and 354. In even other examples, more, fewer, and/or different telemetry devices than telemetry devices 120, 126, and 128 can provide data; while in still other examples, more, fewer, and/or different data can be provided as part of data stream 520. Many other examples are possible as well.

Figure 6:
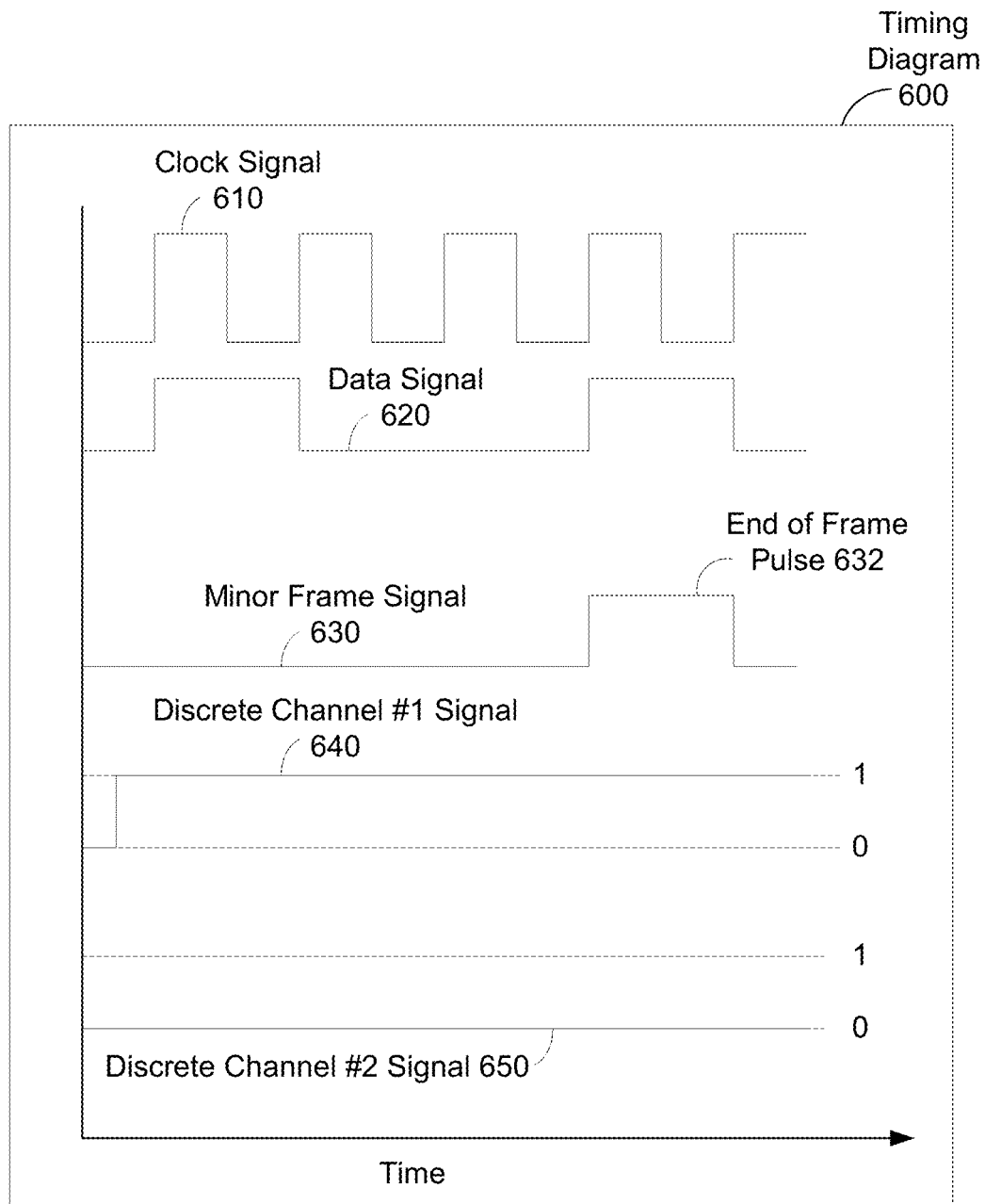
FIG. 6 is a timing diagram for signals used in the telemetry system of FIG. 5, in accordance with an example embodiment.

FIG. 6 is a timing diagram 600 for signals used by telemetry system 500, in accordance with an example embodiment. Timing diagram 600 depicts clock signal 610, data signal 620, minor frame signal 630, discrete channel #1 signal 640, and discrete channel #2 signal 650. Timing diagram 600 shows interactions between the RS-422 interfaces and discrete channels. Clock signal 610 and data signal 620 can be transmitted using, respectively, a clock communication interface and a data communication interface, such as clock communication interfaces 132, 142, 152 and data communication interfaces 130, 140, 150 discussed above in the context of FIGS. 1, 3, and 5. A signals communication interface can communicate some or all of minor frame signal 630, discrete channel #1 signal 640, and discrete channel #2 signal 650, such as signals communication interfaces 134, 144, 154 discussed above in the context of FIGS. 1 and 5.

Then, using signals such as minor frame signal 630 including end of frame pulse 632, discrete channel #1 signal 640, and discrete channel #1 signal 650, telemetry processor 110 can decode received data, such as data conveyed using clock signal 610 and/or data signal 620, without scanning content, such as data provided in data signal 620. Upon reception of minor frame signal 630, telemetry processor 110 can determine if a frame has completed transmitted using a data communication interfaces if end of frame pulse 632 is received; otherwise, telemetry processor 110 can determine that the frame is still in the process of being transmitted (until the next end of frame pulse is received). To generate the end of frame pulse 632, a telemetry device can cause a signaling communication interface output state to switch from high to low or low to high.

Discrete channels 640, 650 can be used as a monitoring feature to signal information about a telemetry configuration, and an identifier identifying which telemetry device is transmitting data on a data communication interface associated with a signaling communication interface. For example, FIG. 6 shows that discrete channel #1 640 is signaling a value of 1, which can indicate an identifier of 1 for a telemetry device sending data to telemetry processor 110. FIG. 6 also shows that discrete channel #2 650 is signaling a value of 0, which can indicate a type of telemetry data equal to zero being sent by a telemetry device to telemetry processor 110. Then, when telemetry processor 110 receives end of frame pulse 632, telemetry processor 110 can use discrete channels 640, 650 to determine the identifier identifying which telemetry device just finished sending a frame of data. Types of telemetry data, such as sensor data, are discussed above in more detail at least in the context of FIG. 1. In other examples, a discrete channel can transmit a configuration value, such as a configuration value of 0 that indicates normal operation configuration, while a configuration value of 1 indicates an erroneous or other abnormal configuration. Many other signals, values, discrete channels, and/or other data can be communicated using a signaling communication interface.

Aggregating Multi-Source Telemetry Data into a Multiplexed CCSDS Data Stream

Figure 7:
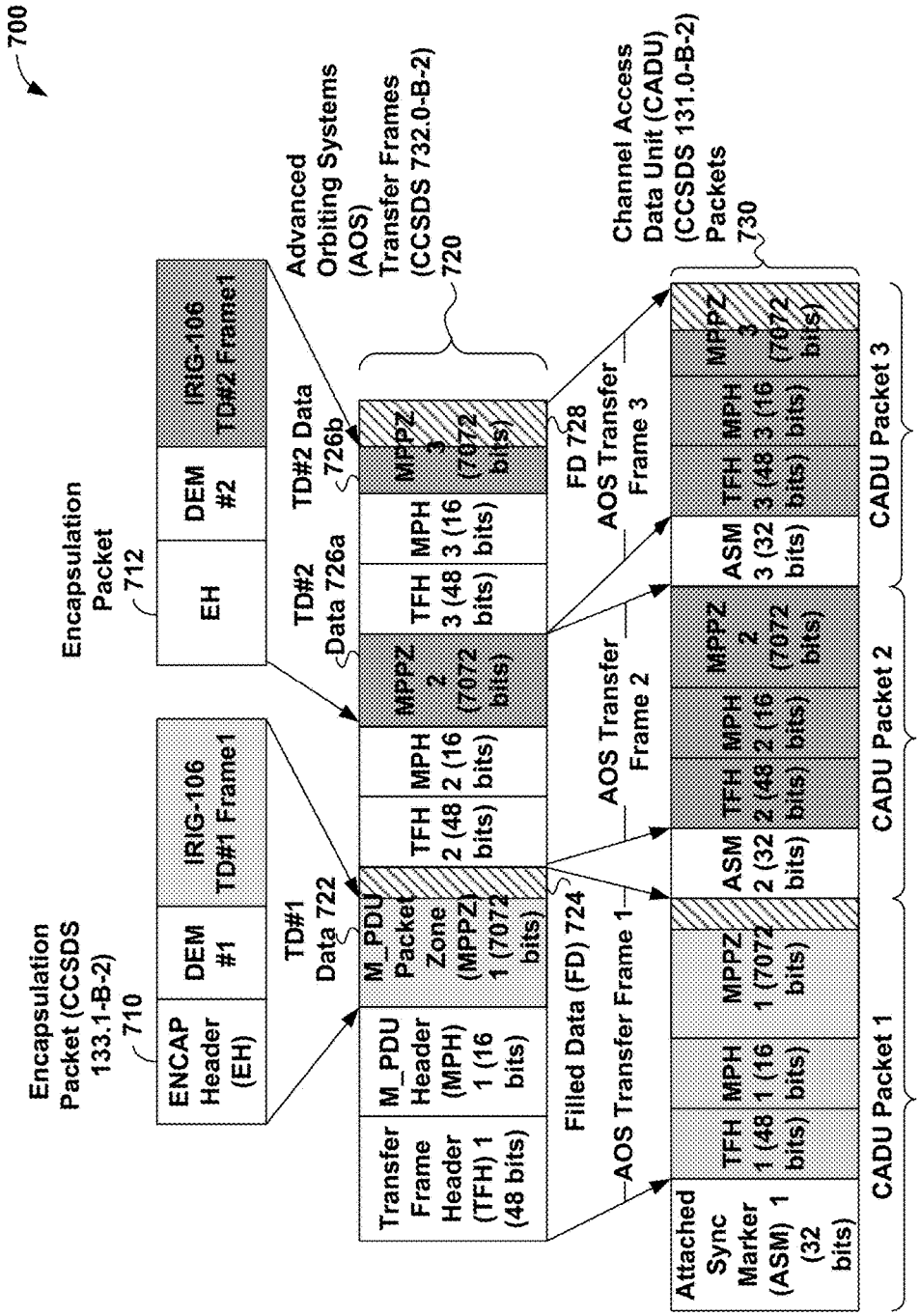
FIG. 7 is a block diagram of a group of data packets, in accordance with an example embodiment.

FIG. 7 is block diagram 700 of a group of data packets, in accordance with an example embodiment. Block diagram 700 includes encapsulation packets 710, 712, AOS transfer frames 720, and CADU packets 730.

Upon reception of a telemetry data message or data frame, such as "IRIG-106 TD#1 Frame1" shown in encapsulation packet 710 or "IRIG-106 TD#2 Frame1" shown in encapsulation packet 712, telemetry processor 110 can put a header with an identifier identifying a source, such as telemetry device 120, 126, or 128, of the telemetry data message or data frame. The source identifier is shown in encapsulation packet 710 as "DEM #1" representing Data Exchange Message (DEM) identifier #1 and is shown in encapsulation packet 712 as "DEM #2" representing DEM identifier #2. In other embodiments, another source identifier can be placed into an encapsulation packet; e.g., a network address (i.e., Internet Protocol (IP) address, Media Access Control (MAC) address) or a name of the source, rather than a DEM identifier.

Telemetry processor 110 can also put an encapsulation header, shown as "ENCAP Header" (EH) for encapsulation packets 710 and 712, on the received telemetry data message or data frame. Each of the encapsulation headers for encapsulation packets 710 and 712 can be compliant with CCSDS Standard 133.1-B-2. An encapsulation header can include a protocol version number, a protocol identifier, and one or more length indicators indicating an amount of data being encapsulated; e.g., for encapsulation packet 712, the one or more length indicators can indicate an amount of data used to store "DEM #2" and "IRIG-106 TD#2 Frame1".

After generating encapsulation packets 710 and 712, telemetry processor 110 can generate AOS transfer frames 720, which can be compliant with CCSDS Standard 732.0-B-2. One transfer frame of AOS transfer frames 720 can be generated by: generating transfer frame header (TFH) 1 and Multiplexing Protocol Data Unit (M_PDU) header (MPH) 1, generating M_PDU Packet Zone (MPPZ) 1 using telemetry device (TD) #1 data 722, which is data from encapsulation packet 710, and filled data (FD) 724, where the combined size of data 722 and filled data 724 is a predetermined number of bits; e.g., 7072 bits as indicated in FIG. 7. In the example shown in FIG. 7, the size of encapsulation packet 710 and the corresponding size of telemetry device #1 data 722 is less than the predetermined number of 7072 bits, so filled data 724 is added to data 722 to reach a total size of the predetermined number of 7072 bits. Filled data can be data having all zeroes, all ones, one or more specific values, and/or other unused data.

AOS transfer frames 720 also include two other transfer frames having transfer frame headers 2 and 3 and M_PDU headers 2 and 3. Each of transfer frame headers 1, 2, and 3 of the three AOS transfer frames 720 can be transfer frame primary headers as described in CCSDS Standard 732.0-B-2. In some embodiments, the transfer frame headers 1, 2, and 3 can omit frame header error control data, and so each of transfer frame headers 1, 2, and 3 can each be 48 bits long. Each of M_PDU headers 1, 2, and 3 can be multiplexing protocol data unit headers and can be 16 bits long. The M_PDU headers 1, 2, and 3 can be used to provide data about respective M_PDU Packet Zones (MPPZs) 1, 2, and 3 of AOS transfer frames 720. Each of MPPZs 1, 2, and 3 can contain data, which may termed "Packets" in CCSDS Standard 732.0-B-2, and/or filled data, which may be termed "Idle Data" in CCSDS Standard 732.0-B-2, and can contain a predetermined amount of data, such as the "7072 bits" stated in FIG. 7.

In the example shown in FIG. 7, AOS transfer frames 720 can include three MPPZs for three AOS transfer frames, with MPPZ 1 containing TD #1 data 722 from telemetry device #1 as indicated in encapsulation packet 710 and filled data 724, as TD #1 data 722 is less than the predetermined number of 7072 bits long. MPPZ 2 contains the predetermined number of 7072 bits of TD #2 data 726*a* from telemetry device #2 as indicated in encapsulation packet 712, and MPPZ 3 contains both a portion of TD #2 data 726*b* and filled data 728, as the portion of TD #2 data 726*b* is less than the predetermined number of 7072 bits long. Filled data 724 and filled data 728 are added to the end of respective MPPZs 1 and 3 to ensure each respective MPPZ has the predetermined number of 7072 bits of data. In other embodiments, the size of an MPPZ can be longer or shorter than the predetermined number of 7072 bits.

After generating three AOS transfer frames 720, telemetry processor 110 can generate three channel access data unit (CADU) packets 730. Each CADU packet of CADU packets 730 includes an attached sync marker (ASM) generated as indicated by CCSDS Standard 131.0-B-2 and an AOS transfer frame. For example, FIG. 7 shows that CADU packets 730 include: CADU packet 1 with ASM #1 and AOS Transfer Frame 1, which in turn includes transfer frame header 1, M_PDU header 1, and M_PDU packet zone 1; CADU packet 2 with ASM #2 and AOS Transfer Frame 2, which in turn includes transfer frame header 2, M_PDU header 2, and M_PDU packet zone 2; and CADU packet 3 with ASM #3 and AOS Transfer Frame 3, which in turn includes transfer frame header 3, M_PDU header 3, and M_PDU packet zone 3. After generating CADU packets 730, telemetry processor 110 can send CADU packets 730 to transmitter 174; i.e., using I channel interface 170 and Q channel interface 172.

In some embodiments, telemetry processor 110 can include data for forward error correction to CADU packets 730; e.g., 1024 bits or another predetermined amount of data generated using low-density parity check (LDPC) techniques and/or randomize data in CADU packets 730 as described in CCSDS Standard 131.0-B-2.

One technique to increase efficiency of telemetry processor 110 in generating data frames and packets can include buffering multiple input data frames; e.g, IRIG-106 formatted data, prior to reformatting into the input data frames into CCSDS-compliant output data packets and/or data frames. By storing more data prior to generating CCSDS-compliant output data packets and/or data frames, telemetry processor 110 can decrease the amount of filled data used in each output data packet and/or data frame.

Figure 8:
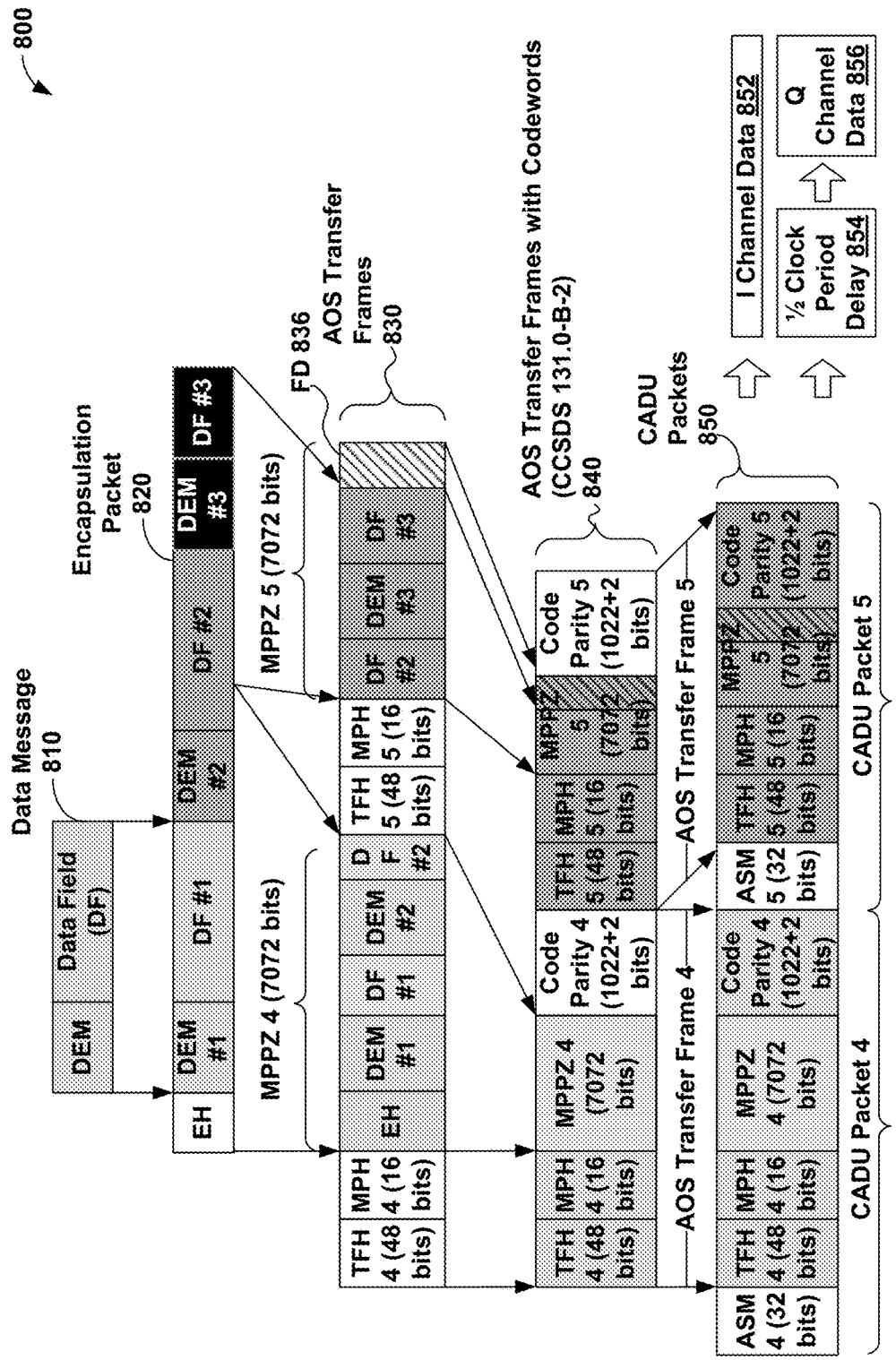
FIG. 8 is a block diagram of another group of data packets, in accordance with an example embodiment.

FIG. 8 is a block diagram 800 of another group of data packets, in accordance with an example embodiment. Block diagram 800 includes data message 810, encapsulation packet 820, AOS transfer frames 830, 840, CADU packets 850, I channel data 852, ½ clock period delay 854, and Q channel data 856. Upon reception of a telemetry data message or data frame, such as data message 810, telemetry processor 110 can put a header with an identifier identifying a source, such as telemetry device 120, 126, or 128, of the telemetry data message or data frame. The source identifier of data message 810 is shown in encapsulation packet 820 as "DEM #1", which identifies the source of data field (DF) #1 also shown in encapsulation packet 820. Encapsulation packet 820 also shows data from two other sources than DEM #1—a source identifier "DEM #2", which identifies the source of data in data field #2, and another source identifier "DEM #3", which identifies the source of data in data field #3. In other embodiments, other kinds of source identifiers than DEM IDs can be placed into an encapsulation packet, such as discussed above in the context of FIG. 7.

After receiving data message 810 and the data in data fields #2 and #3, telemetry processor 110 can also put an encapsulation header onto encapsulation packet 810. Encapsulation packet 820 can be compliant with CCSDS Standard 133.1-B-2. An encapsulation header, such as the encapsulation header for encapsulation packet 820, can include a protocol version number, a protocol identifier, and one or more length indicators, such as discussed above in the context of FIG. 7. FIG. 8 shows that encapsulation packet 820 is an encapsulated data packet with a single encapsulated data packet header, identifiers DEM #1, DEM #2, and DEM #3 identifying telemetry devices (and/or other sources) that are sources of respective data fields #1, #2, and #3, where data fields #1, #2, and/or #3 can include sensor data and perhaps other kinds of data.

After generating encapsulation packet 820, telemetry processor 110 can generate AOS transfer frames 830, which can be compliant with CCSDS Standard 732.0-B-2. One transfer frame of AOS transfer frames 830 can be generated by: generating transfer frame header 4 and multiplexing protocol data unit header 4, generating MPPZ 4 from a first portion of encapsulation packet 820 that is a predetermined number of bits; e.g., 7072 bits as indicated in FIG. 8. Another transfer frame of AOS transfer frames 830 can be generated by: generating transfer frame header 5 and multiplexing protocol data unit header 5, generating MPPZ 5 from a second portion of encapsulation packet 820 and filled data 832, where the second portion of encapsulation packet 820 and filled data 832 have a predetermined number of bits; e.g., 7072 bits as indicated in FIG. 8. In other embodiments, the size of an MPPZ can be longer or shorter than the predetermined number of 7072 bits.

For the example shown in FIG. 8, the first portion of encapsulation packet 820 placed into MPPZ 4 can include the encapsulation header, DEM ID #1, data field #1, DEM ID #2, and a portion of data field #2, and the second portion of encapsulation packet 820 placed into MPPZ 5 can include a portion of data field #2 not in MPPZ 4, DEM ID #3, and data field #3. In this example, the size of encapsulation packet 820 is between the predetermined number of 7072 bits and a value twice the predetermined number of bits (e.g., 14144 bits), so filled data 836 is added to MPPZ 5 to reach a total size of the predetermined number of 7072 bits. Filled data can be data having all zeroes, all ones, one or more specific values, and/or other unused data.

Each of transfer frame headers 4 and 5 of the two AOS transfer frames 830 can be transfer frame primary headers as described in CCSDS Standard 732.0-B-2. In some embodiments, the transfer frame headers 4 and 5 can omit frame header error control data, and so each of transfer frame headers 4 and 5 can each be 48 bits long. Each of M_PDU headers 4 and 5 can be multiplexing protocol data unit headers and can be 16 bits long. The M_PDU headers 4 and 5 can be used to provide data about respective MPPZs 4 and 5 of AOS transfer frames 830. Each of MPPZs 4 and 5 can contain data, which may be termed "Packets" in CCSDS Standard 732.0-B-2, and/or filled data, which may be termed "Idle Data" in CCSDS Standard 732.0-B-2, and can contain a predetermined amount of data, such as the "7072 bits" stated in FIG. 8. In other embodiments, AOS transfer frames 830 can asynchronously encapsulate data provided to telemetry processor 110 and/or can multiplex the provided data an order other than an order of data field #1 followed by data field #2 followed by data field #3.

FIG. 8 illustrates that dividing an encapsulation packet (e.g., encapsulation packet 810) into MPPZ-sized portions of data can involve aggregating multiple telemetry data messages from multiple different telemetry devices; e.g., data message 810 with data field #1 from a first telemetry device associated with DEM #1, a data message with data field #2 from a second telemetry device associated with DEM #2, and a data message with data field #3 from a third telemetry device associated with DEM #3. Then, MPPZ 4 of AOS transfer frames 830 aggregates multiple telemetry data messages from multiple different telemetry devices; e.g, context of data message 810 from the first telemetry device and a portion of a data message from the second telemetry device. MPPZ 5 of AOS transfer frames 830 also aggregates multiple telemetry data messages from multiple different telemetry devices; e.g., content of a remaining portion of the data message from the second telemetry device and the data message from the third telemetry device.

Codeword data can be added to each of the two AOS transfer frames 830 to form AOS transfer frames with codewords 840. The codeword data, represented in FIG. 8 as code parity 4 and code parity 5, can include 1022 parity bits plus 2 zero fill bits per transfer frame for a total of 1024 bits for each of code parities 4 and 5. Low-density parity coding can be used to form code parity 4 and 5 as indicated in CCSDS Standard 131.0-B-2 In some embodiments, code parities 4 and/or 5 can be determined using low-density parity coding a code rate of 7/8. In other embodiments, one or more codewords of 8160 bits can be used.

After generating two AOS transfer frames with codewords 840, telemetry processor 110 can generate two CADU packets 850. Each CADU packet of CADU packets 850 includes an attached sync marker generated as indicated by CCSDS Standard 131.0-B-2 and an AOS transfer frame. For example, FIG. 8 shows that CADU packets 850 include: CADU packet 4 with ASM #4 and AOS Transfer Frame 4, which in turn includes transfer frame header 4, M_PDU header 4, M_PDU packet zone 4, and code parity 4, and CADU packet 5 with ASM #5 and AOS Transfer Frame 5, which in turn includes transfer frame header 5, M_PDU header 5, M_PDU packet zone 5, and code parity 5.

After generating CADU packets 850, telemetry processor 110 can determine I channel data 852 and Q channel data 856 from CADU packets 850. Telemetry processor 110 can determine I channel data 852 using a clock signal provided by a clock, such as clock signal CS1 provided by clock 164, to select I channel data as odd bit data from CADU packets 850 at a rate indicated by clock signal CS1. Telemetry processor 110 can determine Q channel data 856 by delaying the clock signal provided by the clock using a delay, such as delaying clock signal CS1 provided by clock 164 by a delay amount, such as ½ clock period delay 854 indicated in FIG. 8, where the delay amount can be introduced using a delay, such as delay 166. Telemetry processor 110 can then select Q channel data as even bit data from CADU packets 850 at a rate indicated by clock signal CS2. Telemetry processor 110 can provide I channel data 852 and Q channel data 856 to transmitter 174; i.e., using I channel interface 170 and Q channel interface 172, respectively.

In some embodiments, telemetry processor 110 can randomize data in CADU packets 850 as described in CCSDS Standard 131.0-B-2. In embodiments, where codewords in CADU packets are randomized, attached sync markers, such as ASM 4 and ASM 5, may not be randomized.

Figure 9:
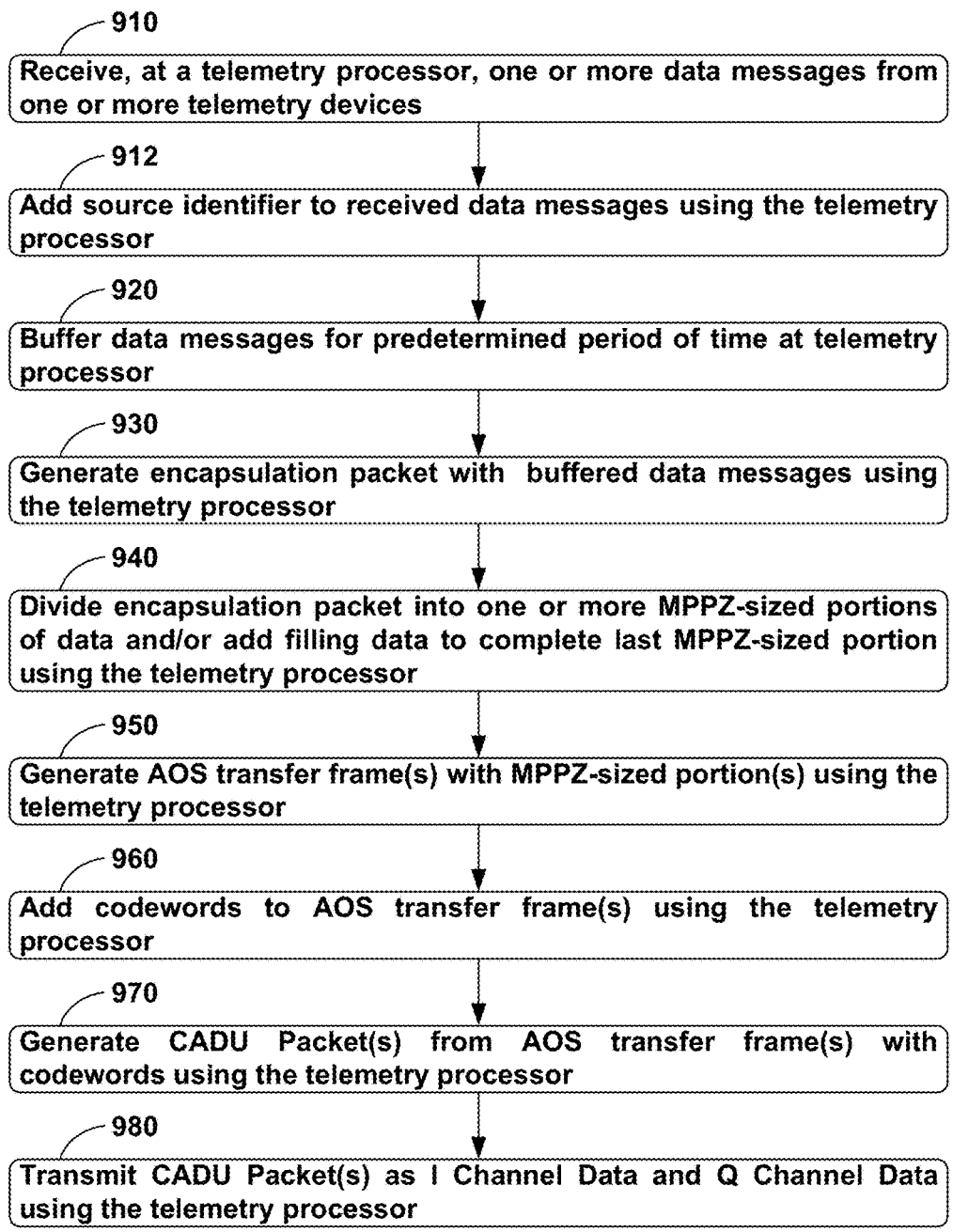
FIG. 9 is a flowchart of another method, in accordance with an example embodiment.

FIG. 9 is a flowchart of method 900, in accordance with an example embodiment; Method 900 can be carried out by a telemetry processor, such as telemetry processor 110, to send CADU packets. Method 900 can begin at block 910, where the telemetry processor can receive one or more data messages from one or more telemetry devices. For example, the telemetry processor can receive data message(s) such as data message 810 from telemetry device(s) such as telemetry devices 120, 126, and/or 128.

At block 912, the telemetry processor can add a source identifier to each data message received at block 910. The source identifier can identify a source of the data message, such as a telemetry device that send the data message, and can be or include a DEM ID and/or other source identifier such as discussed above at least in the context of FIG. 7.

At block 920, the telemetry processor can buffer (or store) the received data messages for a predetermined period of time. For example, during the predetermined period of time, the telemetry processor can receive multiple messages. In some cases, the telemetry processor can combine multiple data messages received during the predetermined period of time; e.g., if two data messages of the same type of telemetry data are received from the same source, then the telemetry processor can combine the two data messages. In some cases, data can be received at the telemetry processor as a data stream rather than in discrete messages—then, the telemetry device can buffer data received in the data stream for the predetermined period of time.

By buffering the received data messages for the predetermined period of time, a larger payload of data can be created. Then, CCSDS overhead can be reduced due to reducing the amount of filled data and/or the number of CCSDS frames and/or packets (and thereby the number of headers and footers in the CCSDS frames and/or packets). By reducing filled data and packet headers/footers in transmitted CCSDS frames and/or packets, the telemetry processor improve overall transmission efficiency of a communication link; e.g., efficiency of downlink 176 to ground station 180.

In some embodiments, the predetermined period of time can specified as a fixed amount of time; e.g., 20 milliseconds. In other embodiments, the predetermined period of time is determined based on a maximum amount of time allocated to transmit telemetry data; e.g., the predetermined period of time can be determined as a percentage of the maximum amount of time allocated to transmit telemetry data. For example, if the maximum amount of time allocated to transmit telemetry data is 150 milliseconds and buffering is allowed for up to 20% of the maximum amount of time, then the predetermined amount of time (to buffer data) can be determined to be 30 milliseconds. Other techniques for calculating the predetermined period of time are possible as well.

At block 930, the telemetry processor can generate an encapsulation packet using the buffered data messages; e.g., generate encapsulation packet 820 using data messages 810. In some embodiments, the telemetry processor can generate a new encapsulation packet whenever a data message for a new type of telemetry data is received. In particular embodiments, a type of telemetry data can be determined based on a virtual channel assignment. Types of telemetry data are discussed above in more detail in the context of FIG. 1. For example, suppose that during the predetermined period of time, the telemetry processor receives five data messages: DM1, DM2, DM3, DM4, DM5, from respective sources S1, S2, S3, S1, S2, and the data messages include data of having types of telemetry data of T1, T1, T2, T1, T2. For this example, the telemetry processor can generate two encapsulation packets—one encapsulation packet EP1 storing data from data messages DM1, DM2, and DM4 as all being type T1 data, and one encapsulation packet EP2 storing data from data messages DM3 and DM5 as all being type T2 data. Other examples are possible as well.

At block 940, the telemetry processor can divide the encapsulation packet(s) determined at block 930 into one or more MPPZ-sized portions of data and/or add filling data to complete a last MPPZ-sized portion. Continuing the example above, suppose encapsulation packet EP1 was 14144 bits long, encapsulation packet EP2 was 14000 bits long, and a size of an MPPZ is 7072 bits. Then, the telemetry processor can divide encapsulation packet EP1 into two MPPZ-sized portions—MP1 and MP2—without adding filling data, as encapsulation packet EP1 is exactly twice the 7072-bit size of an MPPZ. The telemetry processor can divide encapsulation packet EP2 into two MPPZ-sized portions—MP3 and MP4—where MP3 includes 7072 bits of data from EP2 and MP4 includes the remaining 6928 bits from encapsulation packet EP2 plus 144 bits of filing data to complete the last 7072-bit sized MPPZ portion of data MP4.

At block 950, the telemetry processor can generate AOS transfer frame(s) from the MPPZ-sized portion(s) of data determined at block 940; e.g., generate AOS transfer frames 720 or 830 using the MPPZ-sized portions of data. AOS transfer frame formatting and generation are discussed in more detail above in the context of at least FIGS. 7 and 8.

At block 960, the telemetry processor can add codewords to AOS transfer frame(s) determined at block 950; e.g., generate AOS transfer frames with codewords 840. AOS transfer frames with codewords are discussed in more detail above in the context of at least FIG. 8.

At block 970, the telemetry processor can generate CADU Packet(s) from AOS transfer frame(s) with codewords determined at block 960; e.g., generate CADU packets 850 from AOS transfer frames with codewords 840. CADU packets with codewords are discussed in more detail above in the context of at least FIG. 8. In some embodiments, codewords are unused; in these embodiments, the telemetry processor can complete the processing of blocks 910-950, omit block 960, and complete the processing of block 970—example CADU packets without codewords are shown as CADU packets 730 of FIG. 7.

At block 980, the telemetry processor can transmit the CADU Packet(s) determined at block 970 as I Channel Data and Q Channel Data; e.g., transmit CADU packets 850 as I channel data 854 and 856 as discussed above in the context of FIG. 8. Upon completion of block 980, method 900 can be completed.

In some embodiments, implementation of method 900 can include use of a transmit buffer that is a fixed ratio of the transmission rate; e.g, two to three times larger than an amount of data stored for the predetermined amount of time that can be transmitted at the transmission rate. In other embodiments, implementation of method 900 can include use of a transmit buffer that is a fixed size; e.g., a transmit buffer that is 512 kilobytes, 1 megabyte, 2 megabytes, or 10 megabytes.

Figure 10:
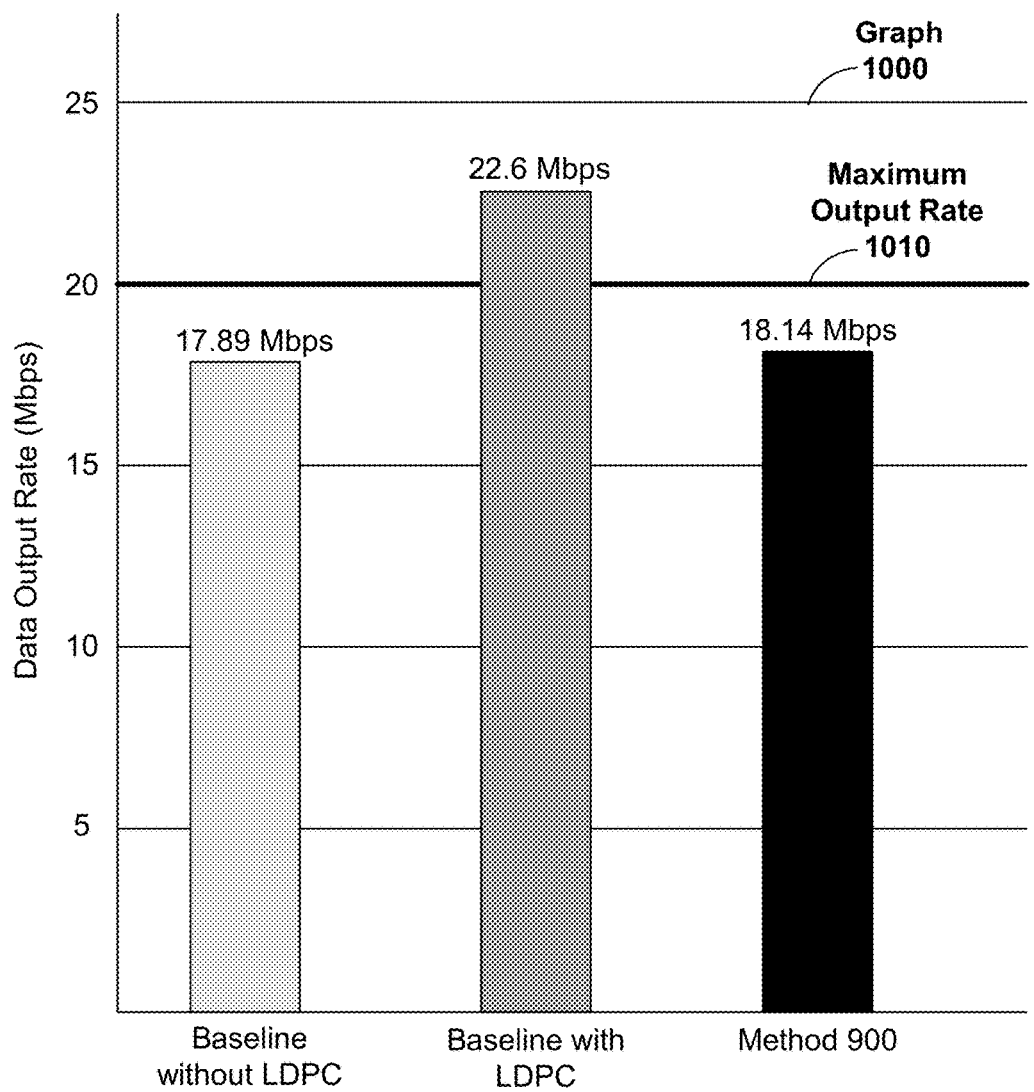
FIG. 10 is another graph of data rates, in accordance with an example embodiment.

FIG. 10 depicts graph 1000 of data rates, in accordance with an example embodiment. Graph 1000 includes a Y-axis indicating data output rates in Mbps for three embodiments of telemetry processor 110 generating data CADU packets, such as CADU packets 730 discussed above in the context of FIG. 7 or CADU packets 850 discussed above in the context of FIG. 8. Graph 1000 indicates the three embodiments are entitled "Baseline without LDPC", "Baseline with LDPC", and "Method 900"; that is, respective embodiments of telemetry processor 110 generating CADU packets 730 without low-density parity checking, generating CADU packets 730 with low-density parity checking, and buffering received data messages and generating CADU packets 850 with low-density parity checking implementing method 900.

Graph 1000 also indicates maximum output rate 1010 of 20 Mbps that represents a maximum amount of data that can be provided using two RS-422 interfaces; e.g., I channel interface 170 and Q channel interface 172. When low-density parity checking is not used by the "Baseline without LDPC" embodiments, the data output rate is 17.89 Mbps which is less than maximum output rate 1010 of 20 Mbps. However, if low-density parity checking is used by the "Baseline with LDPC" embodiments, the data output rate is 22.6 Mbps which is exceeds maximum output rate 1010 of 20 Mbps. Therefore, in applications where low-density parity checking is desired and/or required, generating CADU packets such as CADU packets 730 with low-density parity checking can exceed telemetry output maxima, such as maximum output rate 1010.

One technique, discussed at least in the context of method 900 of FIG. 9, may increase efficiency of telemetry processor 110 in generating data frames and packets by buffering multiple input data frames; e.g, IRIG-106 formatted data, prior to reformatting into the input data frames into CCSDS-compliant output data packets and/or data frames. By storing more data prior to generating CCSDS-compliant output data packets and/or data frames, telemetry processor 110 can decrease the amount of filled data used in each output data packet and/or data frame.

Graph 1000 of FIG. 10 shows that an implementation of telemetry processor 110 using method 900 can transmit CADU packets with low-density parity coding at an data output rate or 18.14 Mbps, which is less than maximum output rate 1010 of 20 Mbps and the "Baseline with LDPC" implementation's data output rate of 22.6 Mbps. Thus, a telemetry processor 110 implementing method 900 can decrease a data output rate for transmitting CADU packets with LDPC by about 4.46 Mbps or about 20% in the example shown by graph 1000. As such, use of method 900 can increase the transmission efficiency of telemetry processor 110. Further, use of method 900 allows telemetry processor 110 to transmit telemetry data with low-density parity checking and still stay below the maximum output rate of 20 Mbps for two RS-422 interfaces.

Parallel Approaches for Increasing Telemetry Data Transmission Rates

Telemetry data can be transmitted via a communication link, such via a downlink to a ground station. In one example, a downlink to a ground station can be a 20 Mbps transmission link using an RF transmitter and can use RS-422 interfaces for design implementation, where the data can be transmitted using I/Q interleaving with 90 degree phase shifting signal for Quadrature Phase Shift Keying (QPSK), and where downlink data is to be compliant with one or more CCSDS standards, such as CCSDS 131.0-B-2, CCSDS 133.1-B-2, and CCSDS 732.0-B-2 (7/8 LDPC). The downlink data can have a time limit, such as 100 milliseconds, to be transmitted from the environment to the ground station. In some examples, CCSDS overhead can be about 20%; that, for a 20 Mbps downlink, CCSDS overhead can consume about 4 Mbps.

A telemetry processor can transmit output data (payload) to an RF transmitter, which can reformat the output data (e.g., by adding CCSDS overhead) and transmitting the reformatted data using I/Q interleaved and modulated signals to the RF transmitter for eventual transmission to the ground station If there is only one RS-422 interface between a telemetry processor and an RF transmitter, the RS-422 interface can be a bottleneck for telemetry data transmission.

Figure 11:
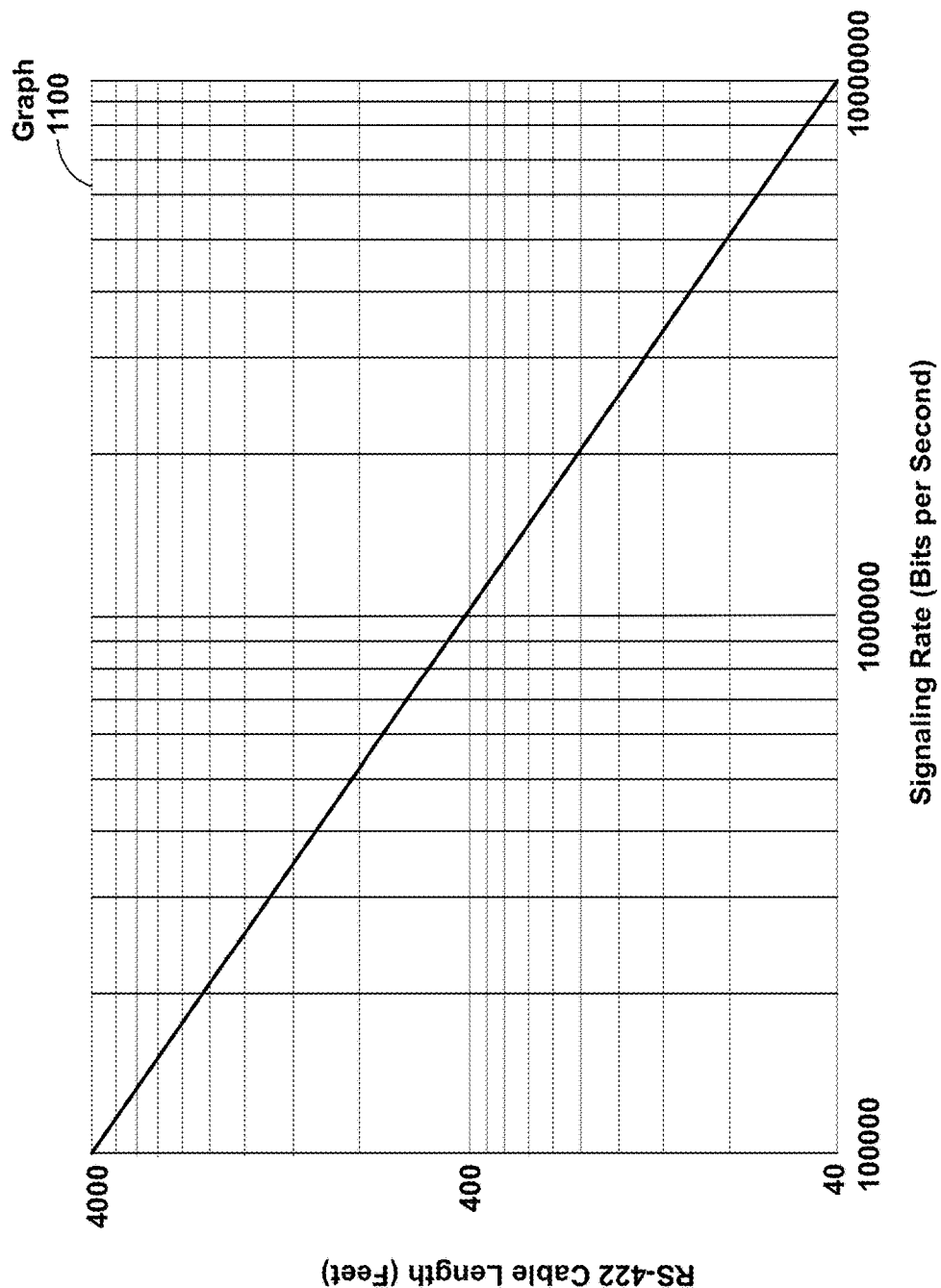
FIG. 11 is a graph relating signaling rates to cable lengths, in accordance with an example embodiment.

FIG. 11 shows graph 1100 relating signaling rates to cable lengths, in accordance with an example embodiment. Graph 1100 includes an X-axis indicating signaling rates in bits per second (bps) and a Y-axis indicating RS-422 cable lengths in feet. Graph 1100 shows that at a maximum length of 4000 feet, an RS-422 cable can enable communications having a maximum signaling rate of 100,000 bps. Graph 1100 also shows that at a maximum length of 400 feet, an RS-422 cable can enable communications having a maximum signaling rate of 1,000,000 bps, and further shows that at a maximum length of 40 feet, an RS-422 cable can enable communications having a maximum signaling rate of 10,000,000 bps.

Graph 1100 indicates that one RS-422 interface can have a maximum data rate of 10 Mbps for cable lengths of 40 feet (about 10 meters) or less. However, if a maximum downlink data rate is 20 Mbps, one RS-422 interface between a telemetry processor and that is limited to 10 Mbps is unlikely to provide enough data to support a downlink data rate of 20 Mbps. As such, multiple RS-422 interfaces can be used to provide enough data to fully utilize a 20 Mbps downlink. One technique can use multiple RS-422 interfaces operating in parallel to provide enough data to fully utilize a downlink. More specifically, a telemetry processor, such as telemetry processor 110, can output signals on two or more RS-422 interfaces operating simultaneously/in parallel, where the signals can include I channel and Q channel data interleaved with a 90 degree phase shift for QPSK modulation, to enable a 20 Mbps transmission rate.

FIG. 12 is a block diagram of a telemetry system 100, in accordance with an example embodiment. FIG. 12 shows that: telemetry system 100 includes telemetry device 120, telemetry processor 110, and transmitter 174; telemetry device 120 includes clock 122 and sensor data 124; telemetry processor 110 includes clock 164, delay 166, data interleaving processor 1210, I channel RS-422 driver 1220, and Q channel RS-422 driver 1230; and transmitter 174 includes RS-422 driver 1230.

Data communications interface 130 can communicate data, such as sensor data 130a, between telemetry device 120 and telemetry processor 110 and clock communications interface 132 can communicate clock data 132a between telemetry device 120 and telemetry processor 110. Sensor data 130a can be received at telemetry processor 110 as one or more input data messages 1200 and clock data 132a can be received at telemetry processor 110 as input clock data 1202. Input clock data 1202 can be used to synchronize reception of data in input data message(s) 1200 at telemetry processor 110.

Both input data message(s) 1200 and input clock data 1202 can be received at data interleaving processor 1210 of telemetry processor 110. Data interleaving processor 1210 can extract bits from input data message(s) 1200 and send the extracted bits to both I channel RS-422 driver 1220 and Q channel RS-422 driver 1222, with odd bits of input data message(s) 1200 being provided as I channel data (ICD) 1212 to I channel RS-422 driver 1220 and even bits of input data message(s) 1200 being provided as Q channel data (QCD) 1214 to Q channel RS-422 driver 1222.

I channel RS-422 driver 1220 and Q channel RS-422 driver 1222 can be synchronized by clock signal CS1 generated by clock 164. Clock signal CS1 can be provided to I channel RS-422 driver 1220, delay 166, and I channel interface 170 (e.g., directly from clock 164 or via I channel RS-422 driver 1220). Delay 166 can slow clock signal CS1 by a predetermined delay period of time, as discussed in more detail above in the context of at least FIG. 1, to generate clock signal CS2. Clock signal CS2 can be provided to Q channel RS-422 driver 1222 and Q channel interface 172 (e.g., directly from delay 166 or via Q channel RS-422 driver 1222). In some embodiments, the predetermined delay period can be a period of time that is ½ of a clock period of clock 164 to provide a 90 degree phase shifting for QPSK modulation.

Thus, clock 164 can directly or indirectly synchronize all I channel and Q channel data processing and transmission of telemetry processor 110, as clock 164 can directly generate clock signal CS1 that synchronizes I channel data processing and transmission, and can indirectly generate (via delay 166) clock signal CS2 that synchronizes Q channel data processing and transmission. Use of a single clock output e.g., CS1, to synchronize data processing and transmission by telemetry processor 110 can reduce skew and/or jitter between clock and data symbols between the I and Q channels, where the skew and/or jitter can occur due to the relatively-high data rate enabled by I-channel interface 170 and Q-channel interface 172.

I channel interface 170 can communicate data, such as I channel clock data/CS1 170a and I channel data 170b, between telemetry processor 110 and transmitter 174. Q channel interface 172 can communicate data, such as Q channel clock data 172a and Q channel data 172b, between telemetry processor 110 and transmitter 174. At transmitter 174, I channel clock data 170a is used to determine clock signal CS1, and I channel data 170b is received as I channel data 1240. At transmitter 174, Q channel clock data 172a is used to determine clock signal CS2, and Q channel data 170b is received as Q channel data 1242. Upon reception of I channel data 1212, Q channel data 1214, CS1, and CS2, RS-422 driver 1230 can provide I channel data 1212 and Q channel data 1214 to one or more antennas of transmitter 174 for RF transmission to ground station 180 and/or another destination. As indicated by FIG. 12, RS-422 driver 1230 can provide data to the one or more antennas at a rate of M Mbps. For example, if CS1 has a clock period of 100 nanoseconds and CS2 has a clock period of 50 nanoseconds, then RS-422 driver 1230 can provide data at a 20 Mbps rate, so M=20. Many other examples are possible as well.

FIG. 13 shows plot 1300 of data and clock signals, accordance with an example embodiment. From top to bottom, plot 1300 shows four items: I channel data (ICD), clock signal CS1 used to synchronize I channel data transmission, Q channel data (QCD) and clock signal CS2 used to synchronize Q channel data transmission. Plot 1300 is generated with clock period 1310 equal to 100 microseconds and delay period 1320 equal to 50 microseconds, indicating that I channel data and Q channel data are being transmitted at 20 Mbps. Plot 1300 shows that each of ICD, CS1, QCD, and CS2 has good signal integrity, which indicates an RF receiver could receive and perhaps decode telemetry data transmitted as I channel data and Q channel data without difficulty.

Figure 14:
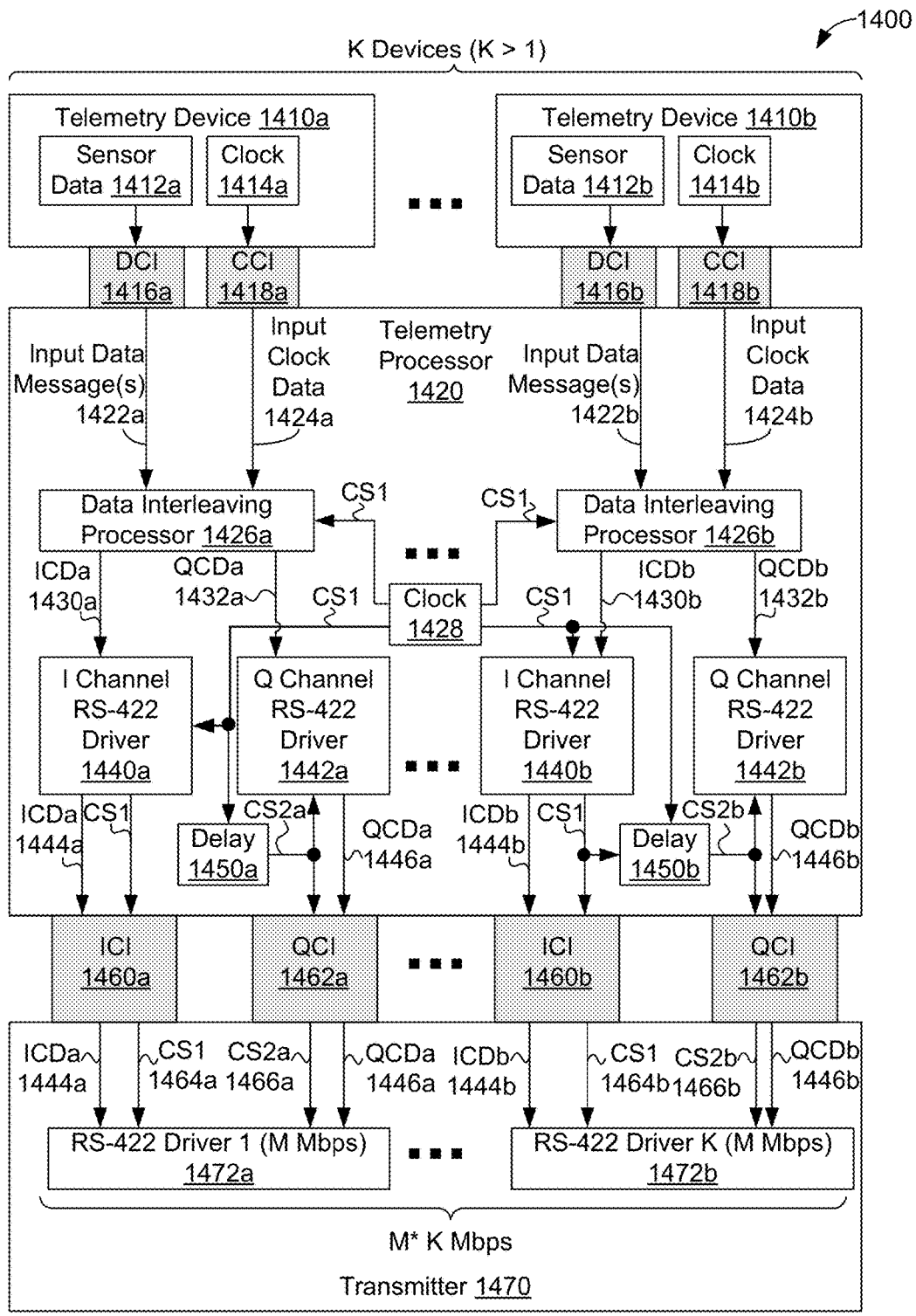
FIG. 14 is a block diagram of a another telemetry system in accordance with an example embodiment.

FIG. 14 is a block diagram of telemetry system 1400 in accordance with an example embodiment. Telemetry system 1400 includes K telemetry devices 1410a . . . 1410b (K>1), telemetry processor 1420, and transmitter 1470. The case where K=1 can be seen as telemetry system 100 of FIG. 12.

The K telemetry devices 1410a . . . 1410b provide respective sensor data 1412a . . . 1412b to telemetry processor 1420 via respective data channel interfaces 1416a . . . 1416b and provide respective clock data 1414a . . . 1414b via respective clock channel interfaces 1418a . . . 1418b; that is telemetry processor 1420 can use at least K data channel interfaces and at least K clock channel interfaces to communicate with K telemetry devices 1410a . . . 1410b.

Respective sensor data 1412a . . . 1412b can be received at telemetry processor 1420 as respective one or more input data messages 1422a . . . 1422b and respective clock data 1414a . . . 1414b can be received at respective data interleaving processors 1426a . . . 1426b of telemetry processor 1410 as respective input clock data 1424a . . . 1424b. Respective input clock data 1424a . . . 1424b can be used to synchronize reception of data in respective input data message(s) 1422a . . . 1424b at respective data interleaving processors 1426a . . . 1426b of telemetry processor 1420. For example, sensor data 1412b provided by telemetry device 1410b to telemetry processor 1420 via data communications interface 1416b can be received as input data message(s) 1422b at data interleaving processor 1426b and clock data 1414b provided by telemetry device 1410b to telemetry processor 1420 via clock communications interface 1418b can be received as input clock data 1424b at data interleaving processor 1426b.

Each of data interleaving processors 1426a . . . 1426b can extract bits from respective input data message(s) 1422a . . . 1422b and send the extracted bits to respective I channel RS-422 drivers 1440a . . . 1440b and Q channel RS-422 drivers 1442a . . . 1442b with odd bits of respective input data message(s) 1422a . . . 1422b being provided as respective I channel data 1430a . . . 1430b to respective I channel RS-422 drivers 1440a . . . 1440b and even bits of respective input data message(s) 1422a . . . 1422b being provided as respective Q channel data 1432a . . . 1432b to respective I channel RS-422 drivers 1442a . . . 1442b. As such, telemetry processor 1420 can include at least K data interleaving processors 1426a . . . 1426b, at least K I channel RS-422 drivers 1440a . . . 1440b, and at least K Q channel RS-422 drivers 1442a . . . 1442b.

All of I channel RS-422 drivers 1440a . . . 1440b and Q channel RS-422 drivers 1442a . . . 1442b can be synchronized by clock signal CS1 generated by clock 1428. Clock signal CS1 can be provided to I channel RS-422 drivers 1440a . . . 1440b, at least K delays 1450a . . . 1450b, and at least K I channel interfaces 1460a . . . 1460b (e.g., directly from clock 1428 or via respective I channel RS-422 drivers 1440a . . . 1440b). Delays 1450a . . . 1450b can slow clock signal CS1 by a predetermined delay period of time, as discussed in more detail above in the context of at least FIG. 1, to generate respective clock signals CS2a . . . CS2b. Clock signals CS2a . . . CS2b can be provided to respective Q channel RS-422 drivers 1442a . . . 1442b and at least K respective Q channel interfaces 1462a . . . 1462b (e.g., directly from respective delays 1450a or via respective Q channel RS-422 drivers 1442a . . . 1442b).

In some embodiments, the predetermined delay period can be a period of time that is ½ of a clock period of clock 1428 to provide a 90 degree phase shifting for QPSK modulation. In other embodiments, telemetry processor 1420 can include only one delay for generating clock signal CS2 and clock signal CS2 can be fanned out to Q channel RS-422 drivers 1442a . . . 1442b and Q channel interfaces 1462a . . . 1462b in a similar fashion as clock signal CS1 is fanned out to I channel RS-422 drivers 1440a . . . 1440b and I channel interfaces 1460a . . . 1460b.

Thus, clock 1428 can directly or indirectly synchronize all I channel and Q channel data processing and transmission of telemetry processor 1420, as clock 1428 can directly generate clock signal CS1 that synchronizes I channel data processing and transmission, and can indirectly generate (via delays 1450a . . . 1450b) clock signals CS2a CS2b that synchronizes Q channel data processing and transmission. Use of a single clock output e.g., CS1, to synchronize data processing and transmission by telemetry device 1420 can reduce skew and/or jitter between clock and data symbols between the I and Q channels, where the skew and/or jitter can occur due to the relatively-high data rate enabled by I-channel interfaces 1460a . . . 1460b and Q-channel interfaces 1462a . . . 1462b.

At least K I-channel interfaces 1460a . . . 1460b can communicate data, such as respective I channel clock data/ CS1 1464a . . . 1464b and respective I channel data 1444a . . . 1444b, between telemetry processor 1420 and transmitter 1470. At least K Q channel interfaces 1462a . . . 1462b can communicate data, such as respective Q channel clock data/clock signals CS2a . . . CS2b 1464a . . . 1464b and respective Q channel data 1446a . . . 1446b, between telemetry processor 1420 and transmitter 1470. At transmitter 1470, I channel clock data 1464a . . . 1464b is used to determine clock signal CS1 and Q channel clock data 1466a . . . 1466b is used to determine clock signals CS2a ... CS2b. Upon reception of respective I channel data 1444a ... 1444b, respective Q channel data 1446a ... 1446b, clock signal CS1, and respective clock signal CS2a CS2b, at least K respective RS-422 drivers 1472a ... 1472b can provide respective I channel data 1444a ... 1444b and respective Q channel data 1446a ... 1446b to one or more antennas of transmitter 1470 for RF transmission to ground station 180 and/or another destination. As indicated by FIG. 14, each of the at least K RS-422 drivers 1472a ... 1472b can provide data to the one or more antennas at a rate of M Mbps for a combined data rate of M*K Mbps. For example, suppose K=3, CS1 has a clock period of 100 nanoseconds, and each of CS2a ... CS2b has a clock period of 50 nanoseconds. Then each one of RS-422 drivers 1472a ... 1472b can provide data at a 20 Mbps rate, so M=20. Additionally, the combined data rate can be K*M Mbps=3*20 Mbps=60 Mbps. Many other examples are possible as well.

Example Computing Device

Figure 15:
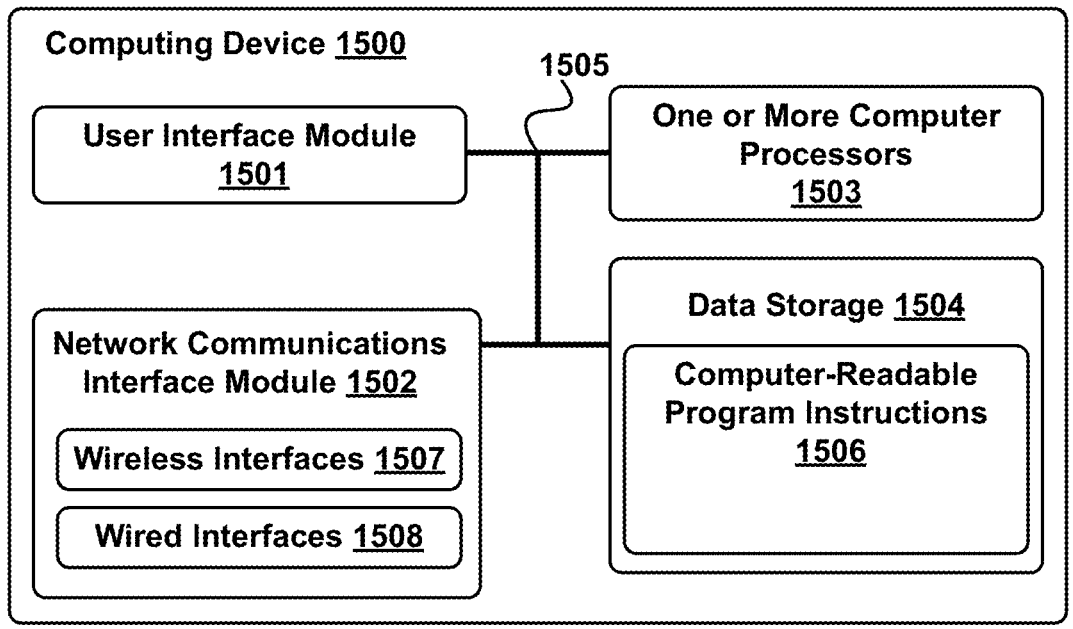
FIG. 15 is a block diagram of a computing device, in accordance with an example embodiment.

FIG. 15 is a block diagram of a computing device 1500, in accordance with an example embodiment. Computing device 1500 can include user interface module 1501, network-communication interface module 1502, one or more computer processors 1503, and data storage 1504, all of which may be linked together via a system bus, network, or other connection mechanism 1505, in accordance with an example embodiment. In particular, computing device 1500 can be configured to perform one or more functions related to: telemetry systems 100, 300, 1400, telemetry processor 110, telemetry devices 120, 126, 128, transmitter 174, ground station 180, vehicle 302, and/or methods 200, 900. In some embodiments, computing device 1500 can be a mobile or non-mobile computing device, and can be embodied as one or more of: desktop computer, laptop or notebook computer, personal data assistant (PDA), mobile phone, smart phone, smart watch, embedded processor, and/or any similar device that is equipped with at least one processing unit capable of executing machine-language instructions that implement at least part of the herein-described techniques and methods, including but not limited to methods 200 and/or 900.

User interface 1501 can receive input and/or provide output, perhaps to a user. User interface 1501 can be configured to send and/or receive data to and/or from user input from input device(s), such as a keyboard, a keypad, a touch screen, a touch pad, a computer mouse, a track ball, a joystick, a game controller, and/or other similar devices configured to receive user input from a user of computing device 1500. User interface 1501 can include output display devices, which can include, but are not limited to, one or more: cathode ray tubes (CRTs), liquid crystal displays (LCDs), light emitting diodes (LEDs), displays using digital light processing (DLP) technology, printers, light bulbs, and/or other devices capable of displaying visual outputs (e.g., graphical, textual, and/or numerical information). User interface module 1501 can also be configured with one or more devices to generate audible output(s), such as a speaker, speaker jack, audio output port, audio output device, earphones, and/or other similar devices configured to convey sound and/or audible information to a user of computing device 1500.

Network-communication interface module 1502 can be configured to send and receive data over wireless interfaces 1507 and/or wired interfaces 1508 via a network. Wireless interface(s) 1507 if present, can utilize an air interface, such as a Bluetooth®, ZigBee®, Wi-Fi, and/or WiMAX interface to a data network, such as a wide area network (WAN), a local area network (LAN), one or more public data networks (e.g., the Internet), one or more private data networks, or any combination of public and private data networks. Wired interface(s) 1508, if present, can comprise a wire, cable, fiber-optic link and/or similar physical connection to a data network, such as a WAN, a LAN, one or more public data networks, such as the Internet, one or more private data networks, or any combination of such networks.

In some embodiments, network-communication interface module 1502 can be configured to provide reliable, secured, and/or authenticated communications. For each communication described herein, information for ensuring reliable communications (i.e., guaranteed message delivery) can be provided, perhaps as part of a message header and/or footer (e.g., packet/message sequencing information, encapsulation header(s) and/or footer(s), size/time information, and transmission verification information such as CRC and/or parity check values). Communications can be made secure (e.g., be encoded or encrypted) and/or decrypted/decoded using one or more cryptographic protocols and/or algorithms, such as, but not limited to, DES, AES, RSA, Diffie-Hellman, and/or DSA. Other cryptographic protocols and/or algorithms can be used as well as or in addition to those listed herein to secure (and then decrypt/decode) communications.

Computer processor(s) 1503 can include one or more central processing units, computer processors, mobile processors, digital signal processors (DSPs), GPUs, microprocessors, computer chips, programmable processors, multi-core processors, and/or other processing units configured to execute machine-language instructions and process data. Processor(s) 1503 can be configured to execute computer-readable program instructions 1506 that are contained in data storage 1504 and/or other instructions as described herein.

Data storage 1504 can include one or more physical and/or non-transitory storage devices, such as read-only memory (ROM), random access memory (RAM), removable disk drives, hard drives, thumb drives, magnetic-tape memory, optical-disk memory, flash memory, volatile storage devices, non-volatile storage devices, and/or other storage devices. Generally, a storage device is hardware that is capable of storing information; for example, data, computer-readable program instructions, and/or other suitable information on a temporary basis and/or a permanent basis. Data storage 1504 can include one or more physical and/or non-transitory storage devices with at least enough combined storage capacity to contain computer-readable program instructions 1506 and any associated/related data structures. In some embodiments, some or all of data storage 1504 can be removable, such as a removable hard drive, removable disk, or flash memory.

Computer-readable program instructions 1506 and any data structures contained in data storage 1504 include computer-readable program instructions executable by processor(s) 1503 and any storage required, respectively, to perform at least part of herein-described scenarios and methods, including but not limited to methods 200 and/or 900. Computer-readable program instructions 1506 can include instructions that when executed by processor(s) 1503 to perform functions, including but not limited to herein-described functionality of software, displays, and/or user interfaces.

Other components shown in FIG. 15 can be varied from the illustrative examples shown. Generally, the different embodiments can be implemented using any hardware device or system capable of running program code.

Disclosed embodiments are described above with reference to the accompanying drawings, in which some, but not all of the disclosed embodiments may be shown. Indeed, several different embodiments may be described and should not be construed as limited to the embodiments set forth herein. Rather, these embodiments are described so that this disclosure are thorough and complete and convey the disclosure at least to those skilled in the art.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent from the foregoing descriptions. Such modifications and variations are intended to fall within the scope of the appended claims.

It should be understood that for the processes and methods disclosed herein, flowcharts show functionality and operation of possible implementations of respective embodiments. In this regard, each block may represent a module, a segment, or a portion of program code, which includes one or more instructions executable by a processor for implementing specific logical functions or steps in the process. The program code may be stored on any type of computer readable medium or data storage, for example, such as a storage device including a disk or hard drive. The computer readable medium may include non-transitory computer readable medium or memory, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a tangible computer readable storage medium, for example.

In addition, each block in the disclosed flowcharts may represent circuitry that is wired to perform the specific logical functions in the process. Alternative implementations are included within the scope of the example embodiments of the present disclosure in which functions may be executed out of order from that shown or discussed, including substantially concurrent or in reverse order, depending on the functionality involved, as would be understood by those reasonably skilled in the art.

The description of the different advantageous arrangements has been presented for purposes of illustration and description, and is not intended to be exhaustive or limited to the embodiments in the form disclosed. Many modifications and variations will be apparent to those of ordinary skill in the art. Further, different advantageous embodiments may describe different advantages as compared to other advantageous embodiments. The embodiment or embodiments selected are chosen and described in order to explain the principles of the embodiments, the practical application, and to enable others of ordinary skill in the art to understand the disclosure for various embodiments with various modifications as are suited to the particular use contemplated.

The invention claimed is:

1. A telemetry processor, comprising:
a plurality of distinct communications interfaces, comprising a first communications interface, a second communications interface, a third communications interface, a fourth communications interface, and a fifth communications interface;
one or more computer processors; and
data storage, storing instructions that, upon execution by the one or more computer processors, cause the telemetry processor to perform functions that include:
buffering sensor data by at least:
receiving a frame of sensor data as modulated data using the first communications interface and clock data using the second communications interface,
receiving a signal indicating an end of the frame of sensor data using the third communications interface, wherein the signal indicating the end of the frame of sensor data is separate from the modulated data, and
storing the received frame of sensor data in the data storage;
after buffering the sensor data, generating an encapsulated data packet including a single encapsulated data packet header, the buffered sensor data, and a plurality of identifiers identifying a plurality of telemetry devices providing the sensor data, wherein a format of the encapsulated data packet complies with a Consultative Committee for Space Data Systems (CCSDS) standard; and
sending the encapsulated data packet using the fourth communications interface and the fifth communications interface.

2. The telemetry processor of claim 1, wherein buffering the sensor data comprises buffering the sensor data for a predetermined period of time.

3. The telemetry processor of claim 1, wherein sending the encapsulated data packet using the fourth communications interface and the fifth communications interface comprises sending the encapsulated data packet using both the fourth and fifth communications interfaces simultaneously.

4. The telemetry processor of claim 3, wherein the encapsulated data packet comprises even bit data and odd bit data, and
wherein sending the encapsulated data packet using both the fourth and fifth communications interfaces simultaneously comprises:
sending the odd bit data via the fourth communications interface; and
sending the even bit data via the fifth communications interface.

5. The telemetry processor of claim 3, wherein the fourth communications interface and the fifth communications interface share a common clock generating a first clock signal,
wherein the fifth communications interface is associated with a delay device that generates a second clock signal which differs from the first clock signal, and
wherein sending the encapsulated data packet using both the fourth and fifth communications interfaces simultaneously comprises:
sending first clock data based on the first clock signal via the fourth communications interface; and
sending second clock data based on the second clock signal via the fifth communications interface.

6. The telemetry processor of claim 5, wherein the common clock is configured to generate the first clock signal with a predetermined clock period of time,
wherein the delay device is configured to determine the second clock signal by delaying the first clock signal for a delay period of time, and wherein the delay period is based on one half of the predetermined clock period.

7. The telemetry processor of claim 1, wherein buffering the sensor data further comprises:
receiving a discrete channel of data via the third communications interface, wherein the discrete channel of data includes data identifying a source telemetry device for the frame of sensor data.

8. The telemetry processor of claim 1, wherein buffering the sensor data further comprises:
receiving a discrete channel of data via the third communications interface, wherein the discrete channel of data includes data related to a configuration of a telemetry device.

9. The telemetry processor of claim 1, wherein the sensor data is associated with a plurality of types of sensor data, wherein the frame of sensor data is associated with a first type of sensor data, and wherein the functions further comprise:
buffering first-type sensor data that is associated with a first type of the plurality of types of sensor data;
after the buffering the first-type sensor data, receiving second-type sensor data that is associated with a second type of the plurality of types of sensor data that differs from the first type of sensor data; and
after receiving the second-type sensor data:
generating a first-type encapsulated data packet including a single encapsulated data packet header and the buffered first-type sensor data, and
generating a second-type encapsulated data packet including a single encapsulated data packet header and the second-type sensor data, wherein formats of both the first-type and second-type encapsulated data packets comply with the CCSDS standard.

10. A method for sending encapsulated data packets, the method comprising:
buffering sensor data using a telemetry processor by at least:
receiving a frame of sensor data as modulated data using a first communications interface and a second communications interface of a plurality of distinct communications interfaces of the telemetry processor that comprise the first communications interface, the second communications interface, a third communications interface, a fourth communications interface, and a fifth communications interface,
receiving a signal indicating an end of the frame of sensor data using the third communications interface, wherein the signal indicating the end of the frame of sensor data is separate from the modulated data, and
storing the received frame of sensor data;
after buffering the sensor data, the telemetry processor generating an encapsulated data packet including a single encapsulated data packet header, the buffered sensor data, and a plurality of identifiers identifying a plurality of telemetry devices providing the sensor data, wherein a format of the encapsulated data packet complies with a Consultative Committee for Space Data Systems (CCSDS) standard; and
sending the encapsulated data packet using the fourth communications interface and the fifth communications interface.

11. The method of claim 10, wherein buffering the sensor data comprises buffering the sensor data for a predetermined period of time.

12. The method of claim 10, wherein sending the encapsulated data packet using the fourth communications interface and the fifth communications interface comprises sending the encapsulated data packet using both the fourth and fifth communications interfaces simultaneously.

13. The method of claim 12, wherein the encapsulated data packet comprises even bit data and odd bit data, and
wherein sending the encapsulated data packet using both the fourth and fifth communications interfaces simultaneously comprises:
sending the odd bit data via the fourth communications interface; and
sending the even bit data via the fifth communications interface.

14. The method of claim 12, wherein the fourth communications interface and the fifth communications interface share a common clock generating a first clock signal,
wherein the fifth communications interface is associated with a delay device that generates a second clock signal which differs from the first clock signal, and
wherein sending the encapsulated data packet using both the fourth and fifth communications interfaces simultaneously comprises:
sending first clock data based on the first clock signal via the fourth communications interface; and
sending second clock data based on the second clock signal via the fifth communications interface.

15. The method of claim 14, wherein the common clock is configured to generate the first clock signal with a predetermined clock period of time,
wherein the delay device is configured to determine the second clock signal by delaying the first clock signal for a delay period of time, and
wherein the delay period is based on one half of the predetermined clock period.

16. The method of claim 10, wherein buffering the sensor data further comprises:
receiving a discrete channel of data via the third communications interface, wherein the discrete channel of data includes data identifying a source telemetry device for the frame of sensor data.

17. The method of claim 10, wherein the sensor data is associated with a plurality of types of sensor data, wherein the frame of sensor data is associated with a first type of sensor data, and wherein the method further comprises:
buffering first-type sensor data that is associated with a first type of the plurality of types of sensor data;
after the buffering the first-type sensor data, receiving second-type sensor data that is associated with a second type of the plurality of types of sensor data that differs from the first type of sensor data; and
after receiving the second-type sensor data:
generating a first-type encapsulated data packet including a single encapsulated data packet header and the buffered first-type sensor data, and
generating a second-type encapsulated data packet including a single encapsulated data packet header and the second-type sensor data, wherein formats of both the first-type and second-type encapsulated data packets comply with the CCSDS standard.

18. A non-transitory computer readable medium having stored thereon instructions, that when executed by one or more computer processors of a telemetry processor, cause the telemetry processor to perform functions comprising:
buffering sensor data by at least:
receiving a frame of sensor data as modulated data using a first communications interface and a second communications interface of a plurality of distinct communications interfaces of the telemetry processor that comprise the first communications interface, the second communications interface, a third communications interface, a fourth communications interface, and a fifth communications interface, receiving a signal indicating an end of the frame of sensor data using the third communications interface, wherein the signal indicating the end of the frame of sensor data is separate from the modulated data, and storing the received frame of sensor data;

after buffering the sensor data, generating an encapsulated data packet including a single encapsulated data packet header, the buffered sensor data, and a plurality of identifiers identifying a plurality of telemetry devices providing the sensor data, wherein a format of the encapsulated data packet complies with a CCSDS standard; and sending the encapsulated data packet using the fourth communications interface and the fifth communications interface.

19. The non-transitory computer readable medium of claim 18, wherein sending the encapsulated data packet using the fourth communications interface and the fifth communications interface comprises sending the encapsulated data packet using both the fourth and fifth communications interfaces simultaneously.

20. The non-transitory computer readable medium of claim 19, wherein the encapsulated data packet comprises even bit data and odd bit data, and wherein sending the encapsulated data packet using both the fourth and fifth communications interfaces simultaneously comprises:

sending the odd bit data via the fourth communications interface; and sending the even bit data via the fifth communications interface.

* * * * *